(12) United States Patent
Kawakami et al.

(10) Patent No.: US 11,979,684 B2
(45) Date of Patent: May 7, 2024

(54) CONTENT DISTRIBUTION DEVICE, CONTENT DISTRIBUTION PROGRAM, CONTENT DISTRIBUTION METHOD, CONTENT DISPLAY DEVICE, CONTENT DISPLAY PROGRAM, AND CONTENT DISPLAY METHOD

(71) Applicant: DWANGO Co., Ltd., Tokyo (JP)

(72) Inventors: Nobuo Kawakami, Tokyo (JP); Takashi Kojima, Tokyo (JP); Hiroaki Saito, Tokyo (JP); Toshihiro Shimizu, Tokyo (JP)

(73) Assignee: DWANGO Co., Ltd., Tokyo (JP)

( * ) Notice: Subject to any disclaimer, the term of this patent is extended or adjusted under 35 U.S.C. 154(b) by 59 days.

(21) Appl. No.: 17/611,558

(22) PCT Filed: Jun. 24, 2020

(86) PCT No.: PCT/JP2020/024705
§ 371 (c)(1),
(2) Date: Nov. 15, 2021

(87) PCT Pub. No.: WO2020/262420
PCT Pub. Date: Dec. 30, 2020

(65) Prior Publication Data
US 2022/0232191 A1    Jul. 21, 2022

(30) Foreign Application Priority Data

Jun. 28, 2019 (JP) .................................. 2019-121972

(51) Int. Cl.
*H04N 7/15* (2006.01)
*G06F 3/01* (2006.01)
(Continued)

(52) U.S. Cl.
CPC ............. *H04N 7/157* (2013.01); *G06F 3/011* (2013.01); *G06F 3/04815* (2013.01); *G06T 13/40* (2013.01); *G06T 19/006* (2013.01)

(58) Field of Classification Search
CPC ..... H04N 7/157; G06F 3/04815; G06F 3/011; G06T 13/40; G06T 19/006
See application file for complete search history.

(56) References Cited

U.S. PATENT DOCUMENTS 6,772,195 B1    8/2004  Hatlelid et al.
2005/0130725 A1  6/2005  Creamer et al.
(Continued)

FOREIGN PATENT DOCUMENTS

CN    105630374 A    6/2016
JP    H11-120373 A    4/1999
(Continued)

OTHER PUBLICATIONS

International Search Report issued in PCT/JP2020/024705; dated Sep. 1, 2020.
(Continued)

*Primary Examiner* — Ryan F Pitaro
(74) *Attorney, Agent, or Firm* — Studebaker & Brackett PC

(57) ABSTRACT

There is provided a content distribution device including a virtual character arrangement acquisitor that acquires an arrangement in a virtual space of each of a plurality of virtual characters respectively corresponding to a plurality of participants in accordance with an operation of a corresponding participant, a trigger detector that detects a first trigger and thereafter detects a second trigger, and a display control data distributor that generates and distributes display control data for displaying at least a part of the virtual space in which the plurality of virtual characters is arranged.

14 Claims, 18 Drawing Sheets

(51) Int. Cl.
  *G06F 3/04815* (2022.01)
  *G06T 13/40* (2011.01)
  *G06T 19/00* (2011.01)

(56) References Cited

U.S. PATENT DOCUMENTS

| | | | |
|---|---|---|---|
| 2009/0210804 A1* | 8/2009 | Kurata | A63F 13/30 |
| | | | 715/757 |
| 2012/0131478 A1* | 5/2012 | Maor | G06T 19/20 |
| | | | 715/757 |
| 2013/0225292 A1 | 8/2013 | Yamaoka et al. | |
| 2016/0241498 A1 | 8/2016 | Senjo et al. | |
| 2018/0189555 A1 | 7/2018 | Satake | |
| 2019/0188895 A1 | 6/2019 | Miller, IV et al. | |
| 2019/0262709 A1 | 8/2019 | Nakamura et al. | |
| 2021/0321061 A1 | 10/2021 | Kawakami et al. | |

FOREIGN PATENT DOCUMENTS

| | | |
|---|---|---|
| JP | 2000-135376 A | 5/2000 |
| JP | 2000-231644 A | 8/2000 |
| JP | 2003-067317 A | 3/2003 |
| JP | 2003-150978 A | 5/2003 |
| JP | 2004-187927 A | 7/2004 |
| JP | 2005-095438 A | 4/2005 |
| JP | 2005-250859 A | 9/2005 |
| JP | 2008-107895 A | 5/2008 |
| JP | 2008-212269 A | 9/2008 |
| JP | 2010-200830 A | 9/2010 |
| JP | 2012-120782 A | 6/2012 |
| JP | 2016-034087 A | 3/2016 |
| JP | 2016-152521 A | 8/2016 |
| JP | 2017-018364 A | 1/2017 |
| JP | 2018-082760 A | 5/2018 |
| JP | 2018-106391 A | 7/2018 |
| JP | 6397595 B1 | 9/2018 |
| JP | 6454883 B1 | 1/2019 |
| JP | 6469279 B1 | 2/2019 |
| JP | 6527627 B1 | 6/2019 |
| KR | 2012-0092960 A | 8/2012 |
| WO | 2009/104564 A1 | 8/2009 |

OTHER PUBLICATIONS

Decision to Grant a Patent mailed by the Japanese Patent Office dated Mar. 7, 2023, which corresponds to Japanese Patent Application No. 2020-060174 and is related to U.S. Appl. No. 17/611,558; with English language translation.

An Office Action; "Notice of Reasons for Refusal," mailed by the Japanese Patent Office dated Nov. 12, 2019, which corresponds to Japanese Patent Application No. 2019-121972 and is related to U.S. Appl. No. 17/611,558; with English language translation.

An Office Action; "Notice of Reasons for Refusal," mailed by the Japanese Patent Office dated Jan. 28, 2020, which corresponds to Japanese Patent Application No. 2019-121972 and is related to U.S. Appl. No. 17/611,558; with English language translation.

Decision to Grant a Patent mailed by the Japanese Patent Office dated Mar. 3, 2020, which corresponds to Japanese Patent Application No. 2019-121972 and is related to U.S. Appl. No. 17/611,558; with English language translation.

An Office Action mailed by China National Intellectual Property Administration dated Sep. 28, 2023, which corresponds to Chinese U.S. Appl. No. 17/611,558.6 and is related to U.S. Appl. No. 17/611,558; with English language translation.

An Office Action; "Notice of Reasons for Refusal," mailed by the Japanese Patent Office on Mar. 5, 2024, which corresponds to Japanese Patent Application No. 2023-060546 and is related to U.S. Appl. No. 17/611,558; with English language translation.

* cited by examiner

CONTENT DISTRIBUTION DEVICE, CONTENT DISTRIBUTION PROGRAM, CONTENT DISTRIBUTION METHOD, CONTENT DISPLAY DEVICE, CONTENT DISPLAY PROGRAM, AND CONTENT DISPLAY METHOD

TECHNICAL FIELD

The present disclosure relates to a content distribution device, a content distribution program, and a content distribution method for distributing a virtual space in which a virtual character is arranged as content. Further, the present disclosure also relates to a content display device, a content display program, and a content display method.

BACKGROUND ART

Patent Literature 1 discloses a content distribution server that causes a display to display a virtual space in which virtual characters are arranged. A virtual character is operated by a user, and normally, display is performed such that operation of the user is faithfully reflected on operation of the virtual character. In this manner, a sense of immersion in the virtual space can be obtained.

CITATION LIST

Patent Literature

Patent Literature 1: JP 6469279 B

SUMMARY OF INVENTION

Technical Problem

However, since the size of the display is finite, it may be difficult to see the virtual character if it is attempted to faithfully reflect an operation of the user on an operation of the virtual character.

In view of such circumstances, an object of the present disclosure is to provide a content distribution server, a content distribution method, and a content distribution program and a content display device, a content display program, and a content display method capable of displaying a virtual character arranged in a virtual space in a more easily viewable manner.

Solution to Problem

According to one embodiment of the present disclosure, provided is a content distribution device comprising: a virtual character arrangement acquisitor configured to acquire an arrangement in a virtual space of each of a plurality of virtual characters respectively corresponding to a plurality of participants in accordance with an operation of a corresponding participant; a trigger detector configured to detect a first trigger and thereafter detect a second trigger; and a display control data distributor configured to generate and distribute display control data for displaying at least a part of the virtual space in which the plurality of virtual characters is arranged, wherein the display control data distributor is configured to: generate the display control data in which arrangement positions of the plurality of virtual characters in the virtual space are arrangement positions according to arrangement positions acquired by the virtual character arrangement acquisitor until the first trigger is detected; generate, in response to detection of the first trigger, the display control data in which an arrangement position in the virtual space of a first virtual character associated with the first trigger among the plurality of virtual characters is changed; and generate, in response to detection of the second trigger, the display control data in which the arrangement position in the virtual space of the first virtual character whose arrangement position has been changed is returned to an arrangement position according to an arrangement position acquired by the virtual character arrangement acquisitor.

It is preferable that the first trigger corresponds to a start of a conversation between a second virtual character associated with the first trigger and the first virtual character, and the second trigger corresponds to an end of the conversation between the second virtual character and the first virtual character.

It is preferable that the display control data distributor generates the display control data in which an arrangement position of the first virtual character in the virtual space is changed so that the first virtual character approaches a predetermined position in response to the detection of the first trigger.

It is preferable that the display control data distributor generates the display control data for displaying at least a part of the virtual space viewed from the predetermined position.

It is preferable that the first trigger is transmitted from a terminal of a first participant corresponding to a second virtual character associated with the first trigger, and the predetermined position is a position of the second virtual character.

It is preferable that the predetermined position is a position different from any of the plurality of virtual characters.

It is preferable that the predetermined position is a position of a third virtual character not associated with the first trigger among the plurality of virtual characters.

It is preferable that in response to the detection of the first trigger, the display control data distributor generates the display control data in which arrangement positions in the virtual space of a third virtual character and a fourth virtual character which are not associated with the first trigger are changed in consideration of a relative positional relationship between the third virtual character and the fourth virtual character acquired by the virtual character arrangement acquisitor.

It is preferable that the display control data distributor generates the display control data in which a display mode of the first virtual character is changed in response to the detection of the first trigger.

According to one embodiment of the present disclosure, provided is a content distribution program causing a computer to function as: a virtual character arrangement acquisitor configured to acquire an arrangement in a virtual space of each of a plurality of virtual characters respectively corresponding to a plurality of participants in accordance with an operation of a corresponding participant; a trigger detector configured to detect a first trigger and thereafter detects a second trigger; and a display control data distributor configured to generate and distributes display control data for displaying at least a part of the virtual space in which the plurality of virtual characters is arranged, wherein the display control data distributor is configured to: generate the display control data in which arrangement positions of the plurality of virtual characters in the virtual space are arrangement positions according to arrangement positions acquired by the virtual character arrangement acquisitor until the first trigger is detected; generate, in response to detection of the first trigger, the display control data in which an arrangement position in the virtual space of a first virtual character associated with the first trigger among the plurality of virtual characters has been changed; and generate, in response to detection of the second trigger, the display control data in which the arrangement position in the virtual space of the first virtual character whose arrangement position has been changed is returned to an arrangement position according to an arrangement position acquired by the virtual character arrangement acquisitor.

According to one embodiment of the present disclosure, provided is a content distribution method comprising: acquiring, by a virtual character arrangement acquisitor, an arrangement in a virtual space of each of a plurality of virtual characters respectively corresponding to a plurality of participants in accordance with an operation of a corresponding participant; detecting, by a trigger detector, a first trigger and thereafter detects a second trigger; and generating and distributing, by a display control data distributor, display control data for displaying at least a part of the virtual space in which the plurality of virtual characters is arranged, wherein the display control data distributor is configured to: generates the display control data in which arrangement positions of the plurality of virtual characters in the virtual space are arrangement positions according to arrangement positions acquired by the virtual character arrangement acquisitor until the first trigger is detected; generates, in response to detection of the first trigger, the display control data in which an arrangement position in the virtual space of a first virtual character associated with the first trigger among the plurality of virtual characters has been changed; and generates, in response to detection of the second trigger, the display control data in which the arrangement position in the virtual space of the first virtual character whose arrangement position has been changed is returned to an arrangement position according to an arrangement position acquired by the virtual character arrangement acquisitor.

According to one embodiment of the present disclosure, provided is a content display device comprising: a virtual character controller configured to transmits, according to an operation of a participant, to a content distribution server, data indicating an arrangement in a virtual space of a first virtual character corresponding to the participant; a trigger generator configured to generate a first trigger and a second trigger and transmits the first trigger and the second trigger to the content distribution server according to an instruction of the participant; and a display controller configured to display at least a part of the virtual space in which a plurality of virtual characters including the first virtual character is arranged on a basis of display control data distributed from the content distribution server, wherein the display controller is configured to: receive, before transmission of the first trigger, the display control data in which arrangement positions of the plurality of virtual characters in the virtual space are arrangement positions corresponding to operations of a plurality of participants respectively corresponding to the plurality of virtual characters; receive, in response to transmission of the first trigger, the display control data in which an arrangement position in the virtual space of a second virtual character associated with the first trigger among the plurality of virtual characters is changed; and receive, in response to transmission of the second trigger after transmitting the first trigger, the display control data in which an arrangement position in the virtual space of the second virtual character whose arrangement position has been changed is returned to an arrangement position according to an arrangement position corresponding to an operation of a participant corresponding to the second virtual character.

According to one embodiment of the present disclosure, provided is a content display program causing a computer to function as: a virtual character controller configured to transmit, according to an operation of a participant, to a content distribution server, data indicating an arrangement in a virtual space of a first virtual character corresponding to the participant; a trigger generator configured to generate a first trigger and a second trigger and transmits the first trigger and the second trigger to the content distribution server according to an instruction of the participant; and a display controller configured to display at least a part of the virtual space in which a plurality of virtual characters including the first virtual character is arranged on a basis of display control data distributed from the content distribution server, wherein the display controller is configured to: receive, before transmission of the first trigger, the display control data in which arrangement positions of the plurality of virtual characters in the virtual space are arrangement positions corresponding to operations of a plurality of participants respectively corresponding to the plurality of virtual characters; receive, in response to transmission of the first trigger, the display control data in which an arrangement position in the virtual space of a second virtual character associated with the first trigger among the plurality of virtual characters is changed; and receive, in response to transmission of the second trigger after transmitting the first trigger, the display control data in which an arrangement position in the virtual space of the second virtual character whose arrangement position has been changed is returned to an arrangement position according to an arrangement position corresponding to an operation of a participant corresponding to the second virtual character.

According to one embodiment of the present disclosure, provided is a content display method comprising: transmitting, by a virtual character controller, according to an operation of a participant, to a content distribution server, data indicating an arrangement in a virtual space of a first virtual character corresponding to the participant; generating, by a trigger generator, a first trigger and a second trigger and transmits the first trigger and the second trigger to the content distribution server according to an instruction of the participant; and displaying, by a display controller, at least a part of the virtual space in which a plurality of virtual characters including the first virtual character is arranged on a basis of display control data distributed from the content distribution server, wherein the display controller is configured to: receives, before transmission of the first trigger, the display control data in which arrangement positions of the plurality of virtual characters in the virtual space are arrangement positions corresponding to operations of a plurality of participants respectively corresponding to the plurality of virtual characters; receives, in response to transmission of the first trigger, the display control data in which an arrangement position in the virtual space of a second virtual character associated with the first trigger among the plurality of virtual characters has been changed; and receives, in response to transmission of the second trigger after transmitting the first trigger, the display control data in which an arrangement position in the virtual space of the second virtual character whose arrangement position is changed is returned to an arrangement position according to an arrangement position corresponding to an operation of a participant corresponding to the second virtual character.

BRIEF DESCRIPTION OF DRAWINGS

FIG. 2 is a block diagram illustrating a schematic configuration of a participant terminal 1a.

FIG. 7A is a diagram schematically illustrating content displayed on a display 15 of the participant terminal 1a.

FIG. 9A is a diagram schematically illustrating content displayed on the display 15 of the participant terminal 1a.

DESCRIPTION OF EMBODIMENTS

Hereinafter, an embodiment of the present disclosure will be described with reference to the drawings. Note that the embodiment described below does not unreasonably limit the content of the present disclosure described in the claims. Further, not all the components illustrated in the embodiment are essential components of the present disclosure.

Figure 1:
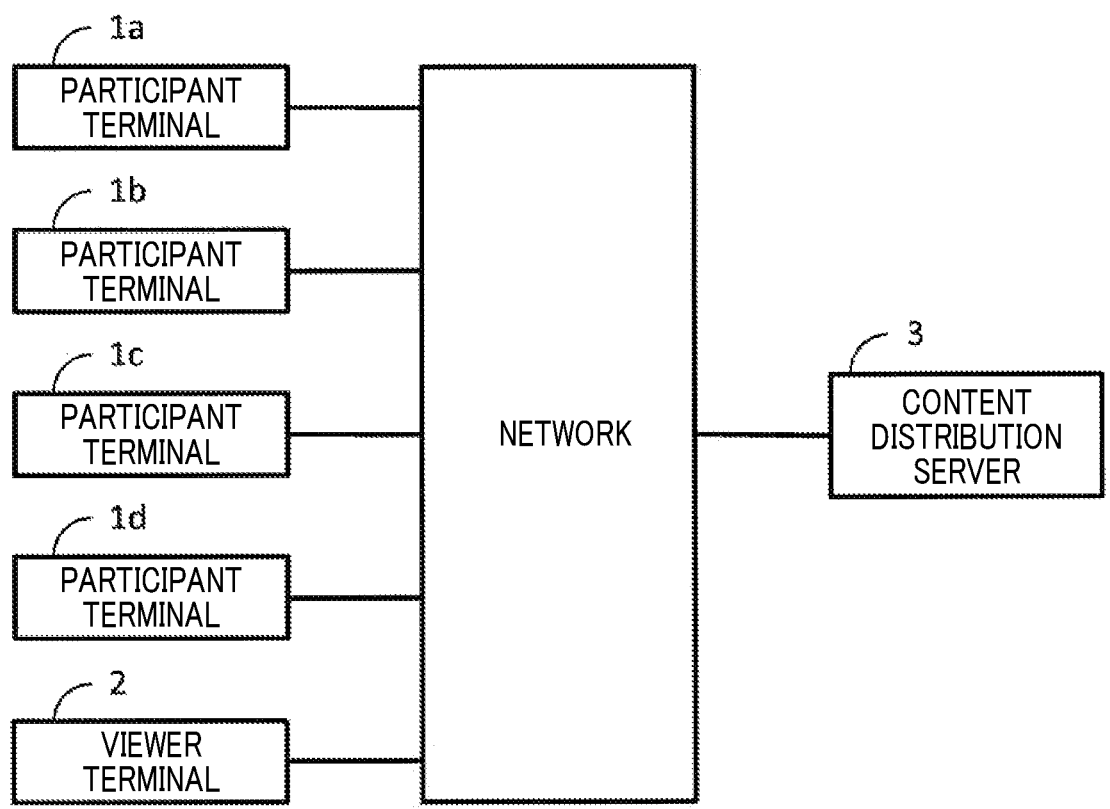
FIG. 1 is a block diagram illustrating a schematic configuration of a content distribution system according to an embodiment.

FIG. 1 is a block diagram illustrating a schematic configuration of a content distribution system according to an embodiment. The content distribution system includes participant terminals 1a to 1d, a viewer terminal 2, a content distribution server 3, and the like, which are communicably connected via a network such as a world area network (WAN). Note that, for convenience, four participant terminals 1a to 1d and one viewer terminal 2 are illustrated, but there is no limitation on the numbers thereof.

This content distribution system enables real-time viewing of a state (hereinafter referred to as "content") in which an avatar (virtual character) corresponding to each of the users of the participant terminals 1a to 1d performs an activity in a predetermined virtual space on the participant terminals 1a to 1d and the viewer terminal 2.

[Configuration of Participant Terminals 1a to 1d]

The participant terminals 1a to 1d are used by the user who causes an avatar to perform an activity in a virtual space (hereinafter referred to as "participant"). Note that, hereinafter, causing the avatar corresponding to oneself to perform an activity in the virtual space is also referred to as "participating". Then, the participants using the participant terminals 1a to 1d are referred to as participants A to D, respectively, and the avatars corresponding to the participants A to D are referred to as avatars A to D, respectively. Since configurations of the participant terminals 1a to 1d are common, the participant terminal 1a will be described as a representative.

Figure 2:
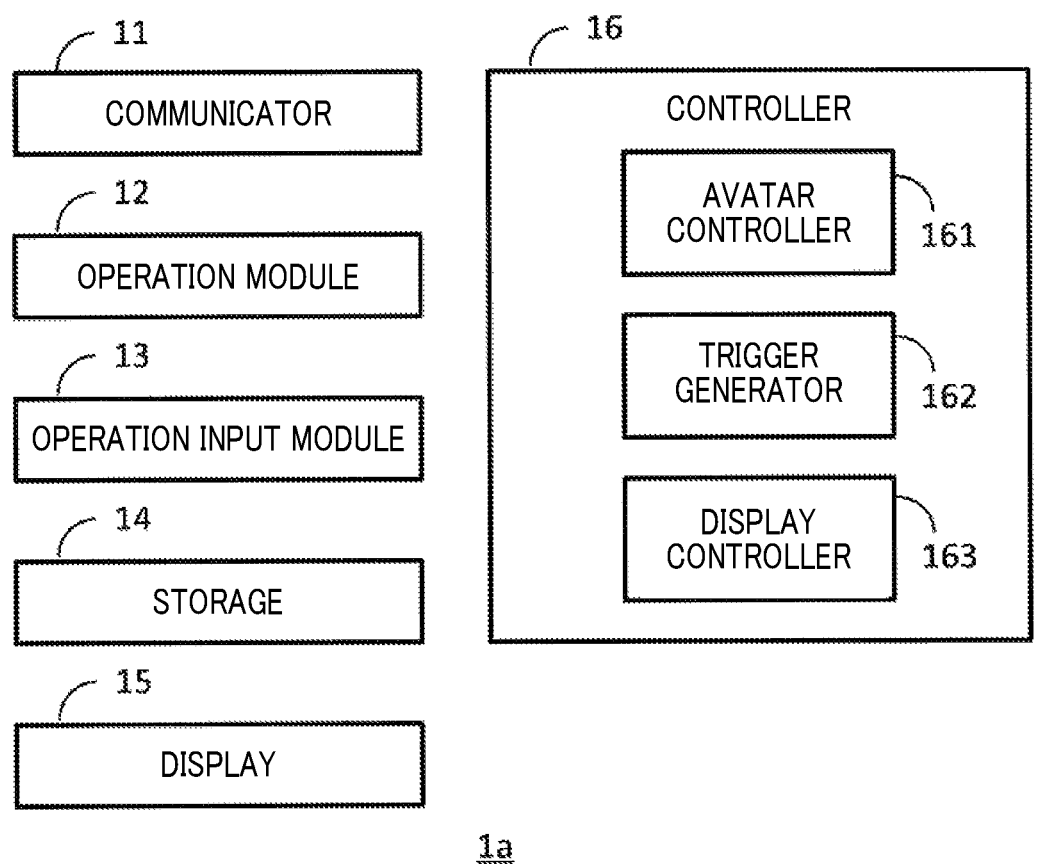

FIG. 2 is a block diagram illustrating a schematic configuration of the participant terminal 1a. The participant terminal 1a includes a communicator 11, an operation module 12, an operation input module 13, a storage 14, a display 15, a controller 16, and the like.

The communicator 11 is a communication interface including a network interface card controller (NIC) for performing wired communication or wireless communication, and communicates with the content distribution server 3 via the network. The operation module 12 is an input interface for the participant to perform various instructions. The operation input module 13 is an input interface that receives an operation for causing the avatar to perform an activity in the virtual space from the participant. The storage 14 includes a random access memory (RAM), a read only memory (ROM), and the like, and non-temporarily or temporarily stores programs for executing various control processes, various data, and the like. Content and the like are displayed on the display 15.

The controller 16 includes an avatar controller 161, a trigger generator 162, a display controller 163, and the like. At least a part of these modules may be implemented by hardware, or may be implemented by a processing circuit (processor) of the participant terminal 1a executing a predetermined program stored in the storage 14.

The avatar controller 161 generates data for causing the avatar to perform an activity in the virtual space according to an operation by the participant A on the operation input module 13. The activity here includes an operation such as a movement, a conversation, or the like. This data is transmitted from the communicator 11 to the content distribution server 3. Note that this data may be transmitted from the communicator 11 to the other participant terminals 1b to 1d or the viewer terminal 2.

The trigger generator 162 generates a trigger according to a predetermined operation on the operation module 12 by the user or a predetermined operation on the operation input module 13. This trigger is transmitted from the communicator 11 to the content distribution server 3. Note that this trigger may be transmitted from the communicator 11 to the other participant terminals 1b to 1d or the viewer terminal 2. In the present embodiment, as an example of the trigger, a conversation start trigger corresponding to the start of a conversation with an avatar corresponding to another user and a conversation end trigger corresponding to the end of the started conversation will be described. As will be described later, the arrangement of the avatar arranged in the virtual space is changed in response to the trigger.

The display controller 163 receives display control data (described later) transmitted from the content distribution server 3, and displays content on the display 15 on the basis of the display control data.

As an example, the participant terminal 1a may be a smartphone (or a tablet terminal). The smartphone includes a touch panel display and a microphone. In the touch panel display, for example, a liquid crystal display and a transparent touch pad are arranged by stacking together, the liquid crystal display functions as the display 15, and the touch pad functions as the operation module 12 and the operation input module 13.

Then, the avatar in the virtual space performs an activity according to the participant's operation on the touch pad. For example, the participant swipes in the right direction on the touch pad, so that the avatar moves in the right direction in the virtual space. Further, the microphone may function as the operation input module 13, and the avatar in the virtual space may perform an activity according to an utterance of the participant to the microphone. For example, the utterance of the user to the microphone may be reflected in an utterance of the avatar in the virtual space. In addition, various sensors and buttons such as an acceleration sensor provided in the smartphone may function as the operation module 12 and/or the operation input module 13.

As another example, the operation module 12 of the participant terminal 1a may be a stick type controller for virtual reality (VR) including operation buttons, a keyboard, a pointing device, and the like. The operation input module 13 may be a motion sensor that detects a movement of the participant. The avatar in the virtual space operates according to the detected movement (motion data) of the participant. For example, when the participant faces right, the avatar faces right in the virtual space. Furthermore, the display 15 may be a head mount display (HMD).

As described above, the participant terminal 1a may include one device such as a smartphone, or may include a plurality of devices such as a VR controller, a motion sensor, and an HMD.

[Configuration of Viewer Terminal 2]

The viewer terminal 2 is used by a user (hereinafter, referred to as a "viewer") who views content without participating in the content.

Figure 3:
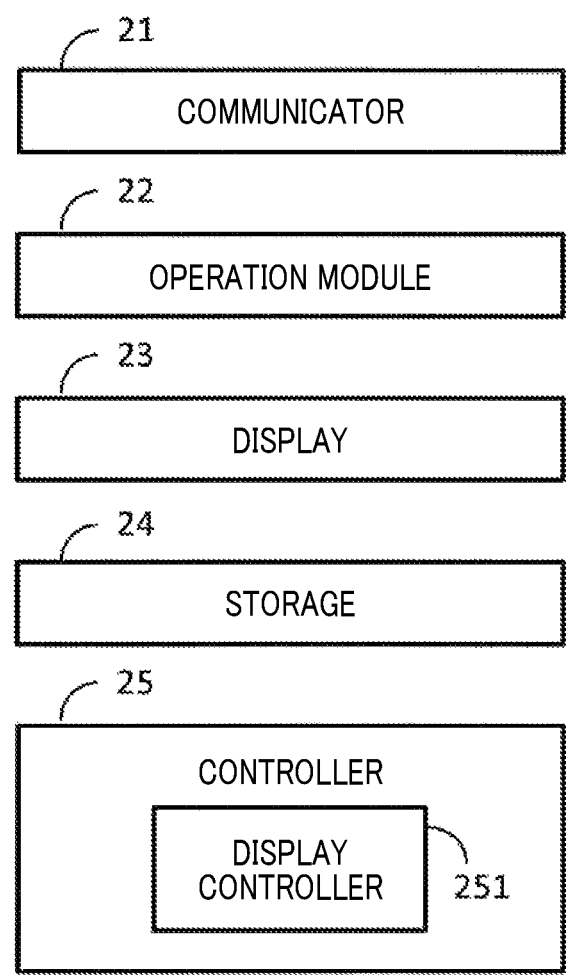
FIG. 3 is a block diagram illustrating a schematic configuration of a viewer terminal 2.

FIG. 3 is a block diagram illustrating a schematic configuration of the viewer terminal 2. In the viewer terminal 2, the operation input module 13, the avatar controller 161, and the trigger generator 162 in the participant terminal 1a are omitted. The viewer terminal 2 having such a simple configuration is sufficient for only viewing the content. Of course, the content may be viewable using the participant terminal 1a without participating in the content.

[Configuration of Content Distribution Server 3]

Figure 4:
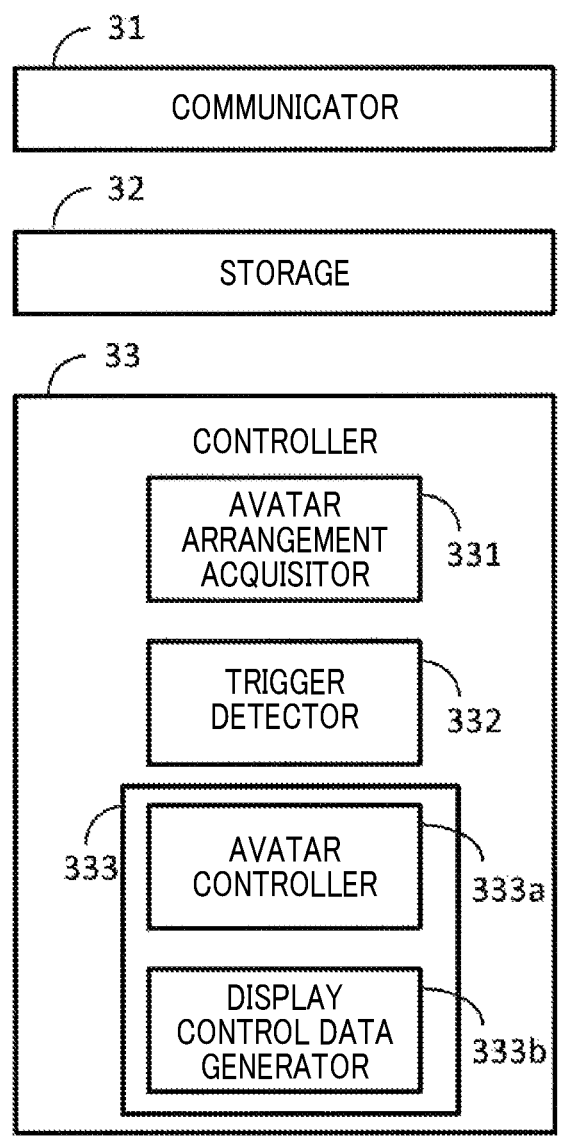
FIG. 4 is a block diagram illustrating a schematic configuration of a content distribution server 3.

FIG. 4 is a block diagram illustrating a schematic configuration of the content distribution server 3. The content distribution server 3 includes a communicator 31, a storage 32, a controller 33, and the like. Note that the content distribution server 3 may include one device or may include a plurality of devices.

The communicator 31 is a communication interface including an NIC for performing wired communication or wireless communication, and communicates with the participant terminals 1a to 1d and the viewer terminal 2 via a network. The storage 32 includes a RAM, a ROM, and the like, and non-temporarily or temporarily stores programs for executing various control processes, various data, and the like.

The controller 33 includes an avatar arrangement acquisitor 331, a trigger detector 332, a display control data distributor 333, and the like. At least a part of these may be implemented by hardware, or may be implemented by a processing circuit (processor) of the content distribution server 3 executing a predetermined program stored in the storage 32.

The avatar arrangement acquisitor 331 acquires respective arrangements of the avatars corresponding to the respective participants in the virtual space from the avatar controllers 161 of the participant terminals 1a to 1d. For example, the arrangement of the avatar A in the virtual space is acquired in accordance with an operation of the participant A on the operation input module 13 of the participant terminal 1a. The acquired arrangement may be temporarily stored in the storage 32. Note that the arrangement in the present description may be both or at least one of a position of the avatar or a direction of the avatar in the virtual space.

The trigger detector 332 detects that a trigger is generated by the trigger generator 162 of the participant terminals 1a to 1d. Here, an avatar (hereinafter referred to as a "conversation avatar") participating in a conversation is associated with the conversation start trigger. In other words, an avatar that is associated with the conversation start trigger is the conversation avatar, and an avatar that is not unassociated does not participate in the conversation (hereinafter referred to as a "non-conversation avatar"). The trigger detector 322 also identifies the conversation avatar associated with the conversation start trigger. Note that the conversation avatar is usually a plurality of avatars including the avatar corresponding to the participant using the participant terminal that has generated the conversation start trigger, but may be only one avatar.

The display control data distributor 333 generates display control data on the basis of the arrangement of each avatar acquired by the avatar arrangement acquisitor 331 and the trigger detected by the trigger detector 332, and distributes the display control data to the participant terminals 1a to 1d and the viewer terminal 2. Specifically, the display control data distributor 333 includes an avatar controller 333a and a display control data generator 333b.

The avatar controller 333a controls the arrangement of each avatar in the virtual space, and generates avatar arrangement information indicating the arrangement of each avatar in the virtual space. The avatar controller 333a controls a display mode of each avatar, and the avatar arrangement information may include a display mode of the avatar. The avatar arrangement information is used for displaying content on the display 15 of the participant terminals 1a to 1d or the display 23 of the viewer terminal 2, that is, for generating display control data.

Specifically, until the conversation start trigger is detected, the avatar controller 333a arranges the avatar in the virtual space according to the arrangement acquired by the avatar arrangement acquisitor 331, and generates the avatar arrangement information. It can be said that the arrangement of the avatar until the conversation start trigger is detected faithfully reflects the user operations on the operation inputters 13 of the participant terminals 1a to 1d.

Further, in response to detection of the conversation start trigger, the avatar controller 333a changes the arrangement of at least a part of avatars (for example, at least a part of conversation avatars) in the virtual space, and updates the avatar arrangement information. The arrangement after the change does not necessarily match the arrangement acquired by the avatar arrangement acquisitor 331. That is, the arrangement of the avatar after the conversation start trigger is detected does not faithfully reflect the operations of the participants on the operation inputters 13 of the participant terminals 1a to 1d.

Note that the change of the arrangement may be a change in the position in the virtual space, may be a change in the direction of the avatar in the virtual space, or may be the both. Examples of the change include a change such that the conversation avatar is highlighted, a change such that the conversation avatar approaches a predetermined position, and a change such that the conversation avatar faces a predetermined position. Further, in a case where only a part of the virtual space is not displayed on the displays 15 and 23, the position of the conversation avatar may be changed so that all the conversation avatars are displayed. Alternatively, the display mode of the conversation avatar may be changed (while the avatars are usually six heads tall, changing only the conversation avatar to eight heads tall, or the like). Details will be described later.

Note that the avatar controller 333a desirably stores the arrangement of the avatar before the change in the storage 32 so that the arrangement of the avatar before the change (the arrangement acquired by the avatar arrangement acquisitor 331) will not be lost.

Then, in response to detection of the conversation end trigger after the conversation start trigger, the avatar controller 333a returns the arrangement of the avatar whose arrangement has been changed to the arrangement acquired by the avatar arrangement acquisitor 331, and updates the avatar arrangement information. Thus, the arrangement of the avatar after the conversation end trigger is detected returns to the arrangement that faithfully reflects the operations of the participants on the operation inputters 13 of the participant terminals 1a to 1d. At this time, the avatar controller 333a may use the arrangement of the avatar stored in the storage 32.

The display control data generator 333b uses the avatar arrangement information generated and/or updated by the avatar controller 333a to generate the display control data for displaying content on the displays 15 of the participant terminals 1a to 1d and the display 23 of the viewer terminal 2. The display control data is distributed from the communicator 31 to the participant terminals 1a to 1d and the viewer terminal 2.

Note that rendering of the images displayed on the displays 15 and 23 may be performed by the display controllers 163 of the participant terminals 1a to 1d and the display controller 251 of the viewer terminal 2, or may be performed by the display control data generator 333b of the content distribution server 3.

In a case where the participant terminals 1a to 1d perform rendering, data indicating the arrangement and the display mode of each avatar in the virtual space based on the avatar arrangement information is distributed as the display control data. Then, on the basis of the display control data, the display controller 163 of each of the participant terminals 1a to 1d generates an image of the content in which each avatar is arranged in the virtual space, and displays the image on the display 15. These are performed similarly in a case where the viewer terminal 2 performs rendering.

On the other hand, in a case where the display control data generator 333b of the content distribution server 3 performs rendering, the display control data generator 333b generates data (image data) corresponding to the image of the content in which each avatar is arranged in the virtual space on the basis of the avatar arrangement information. Then, the generated image data is distributed as the display control data. Then, the display controllers 163 and 251 cause the displays 15 and 23 to display the image of the content on the basis of the display control data.

As described above, the rendering may be performed by the participant terminals 1a to 1d and the viewer terminal 2 or may be performed by the content distribution server 3, but the former is desirable in order not to cause a time lag.

Here, the content displayed on the participant terminals 1a to 1d and the viewer terminal 2 may be common to the participant terminals 1a to 1d and the viewer terminal 2, but is desirably different from each other. Specifically, a virtual space for which the avatar A is a viewpoint is displayed as the content on the participant terminal 1a. This is similarly performed on the participant terminals 1b to 1d. Further, on the viewer terminal 2, a virtual space for which a virtual camera set at an arbitrary position in the virtual space (for example, a position at which the virtual space can be looked down) is a viewpoint is displayed as the content.

Further, the viewpoint may be switchable. For example, the virtual space viewed from the avatar A is displayed as initial setting on the participant terminal 1a, but a virtual space viewed from another avatar or a virtual space viewed from the virtual camera may be displayed in response to a predetermined operation on the operation module 12. Further, on the viewer terminal 2, although the virtual space viewed from the virtual camera is displayed as initial setting, a virtual space viewed from a specific avatar may be displayed in response to a predetermined operation on the operation module 22. Furthermore, in the virtual space, a plurality of virtual cameras having different installation positions or different zooms may be set, and it may be possible to switch which virtual space is displayed as viewed from which virtual camera. Moreover, the entire virtual space may be displayed, or only a part thereof may be displayed.

[Processing Operation of Content Distribution System Before Conversation Starts]

Figure 5:
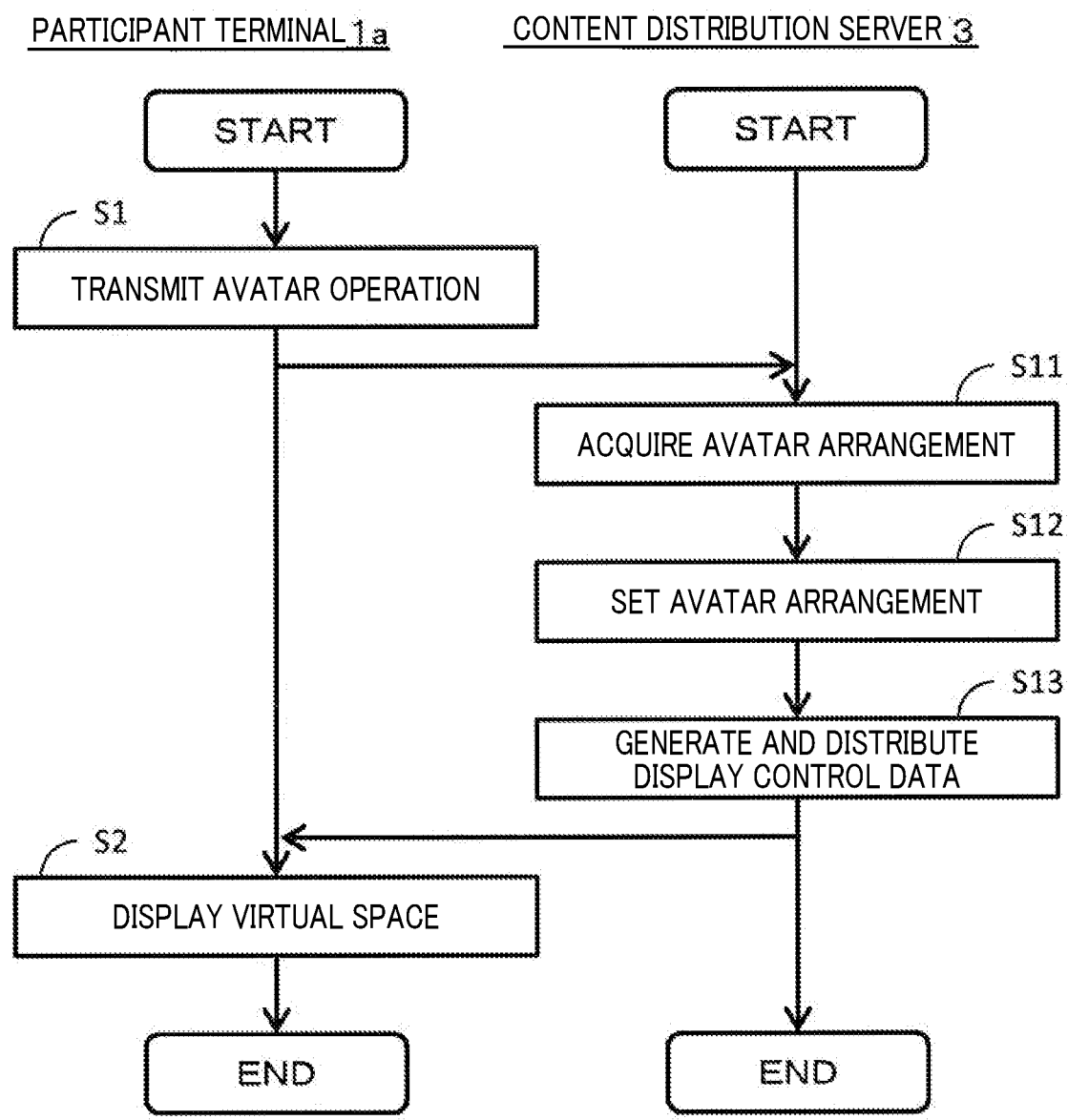
FIG. 5 is a sequence diagram illustrating an example of a processing operation of the content distribution system before a conversation starts.

FIG. 5 is a sequence diagram illustrating an example of a processing operation of the content distribution system before a conversation starts. Note that only the participant terminal 1a will be described below, but this is similarly applicable to the other participant terminals 1b to 1d.

When the participant A performs a predetermined operation on the operation input module 13 in the participant terminal 1a, the avatar controller 161 generates data for moving the avatar A in the virtual space and transmits the data to the content distribution server 3 (step S1). The operation of the avatar A here is an arrangement of the avatar A in the virtual space, and specifically, moving the avatar A in the virtual space or causing the avatar A to face a specific direction.

Then, the content distribution server 3 receives the above-described data. On the basis of this data, the avatar arrangement acquisitor 331 acquires an arrangement (position and/or direction) of the avatar A in the virtual space (step S11). This arrangement reflects the operation of the participant A on the operation input module 13 as it is.

Subsequently, on the basis of the acquired arrangement, the avatar controller 333a sets the arrangement of the avatar A in the virtual space, and generates the avatar arrangement information (step S12). Again, this arrangement also reflects the operation of the participant A on the operation input module 13 as it is.

Next, the display control data generator 333b generates display control data on the basis of the generated avatar arrangement information. Then, the display control data is distributed to the participant terminal 1a (step S13). Further, the display control data is also distributed to the other participant terminals 1b to 1d and the viewer terminal 2.

In accordance with the distribution of the display control data from the content distribution server 3, the display controller 165 of the participant terminal 1a receives the display control data. In the display control data, the avatars A to D are arranged in the virtual space in accordance with the operations of the respective participants A to D. On the basis of such display control data, the display controller 163 causes the display 15 to display the content (virtual space in which the avatar is arranged) (step S2). The other participant terminals 1b to 1d and the viewer terminal 2 similarly display the content. The above processing is repeated every time data for causing the avatar to operate is transmitted from any of the participant terminals 1a to 1d.

Figure 6:
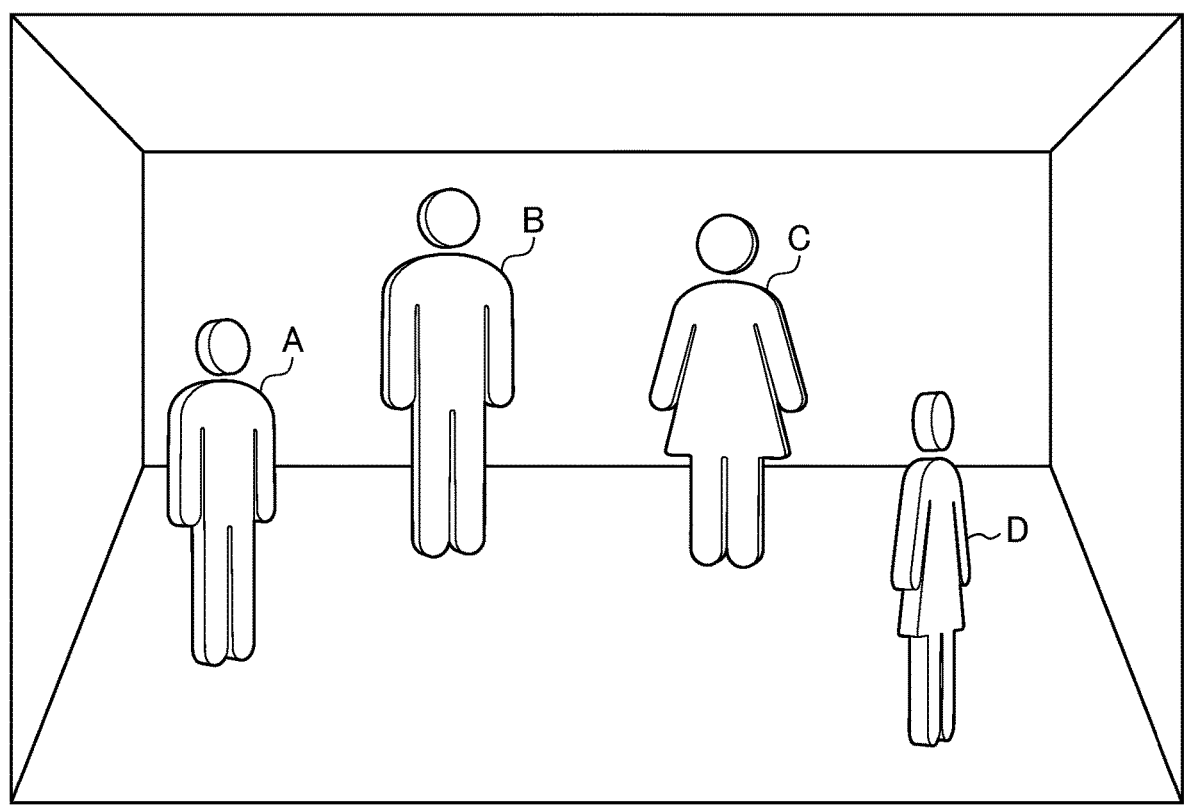
FIG. 6 is a diagram schematically illustrating a state in which avatars A to D are arranged in a virtual space.

FIG. 6 is a diagram schematically illustrating a state in which the avatars A to D are arranged in the virtual space. As illustrated, it is assumed that the avatars A to D are arranged in order from the left side.

Figure 7A:
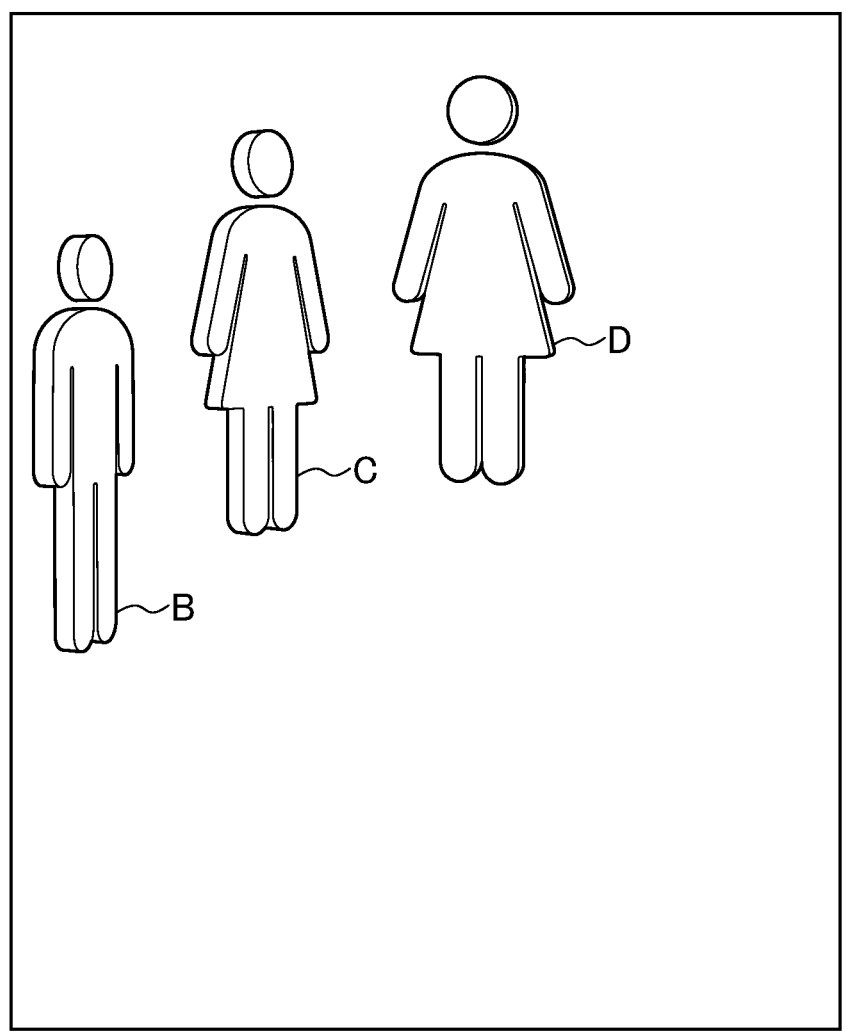

FIG. 7A is a diagram schematically illustrating content displayed on the display 15 of the participant terminal 1a, and corresponds to FIG. 6. As illustrated in FIG. 7A, the virtual space viewed from the avatar A in FIG. 6 is displayed on the display 15 of the participant terminal 1a. In a case where the participant terminal 1a is a smartphone, the normal display 15 is vertically long and looks compressed in the lateral direction, but faithfully reproduces the positions and directions of the avatars A to D in FIG. 6.

Figure 7B:
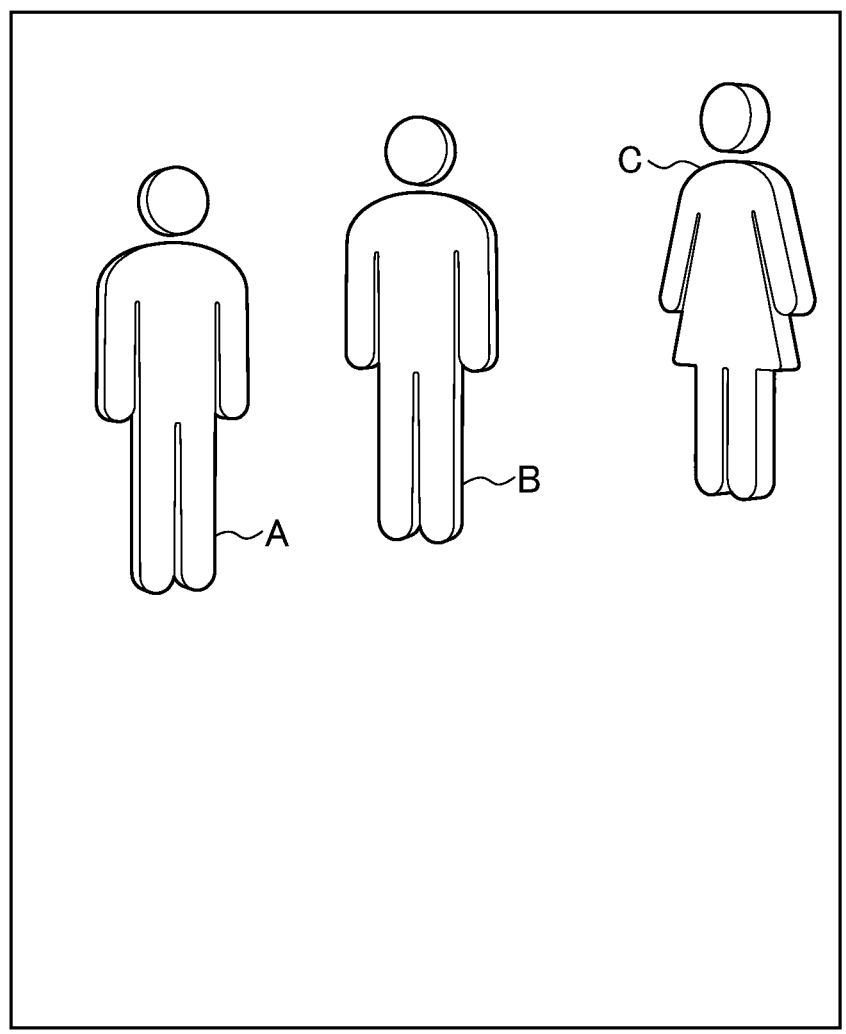
FIG. 7B is a diagram schematically illustrating content displayed on a display 15 of a participant terminal 1d.

FIG. 7B is a diagram schematically illustrating content displayed on the display 15 of the participant terminal 1d, and corresponds to FIG. 6. As illustrated in FIG. 7B, the virtual space viewed from the avatar D in FIG. 6 is displayed on the display 15 of the participant terminal 1b.

Figure 7C:
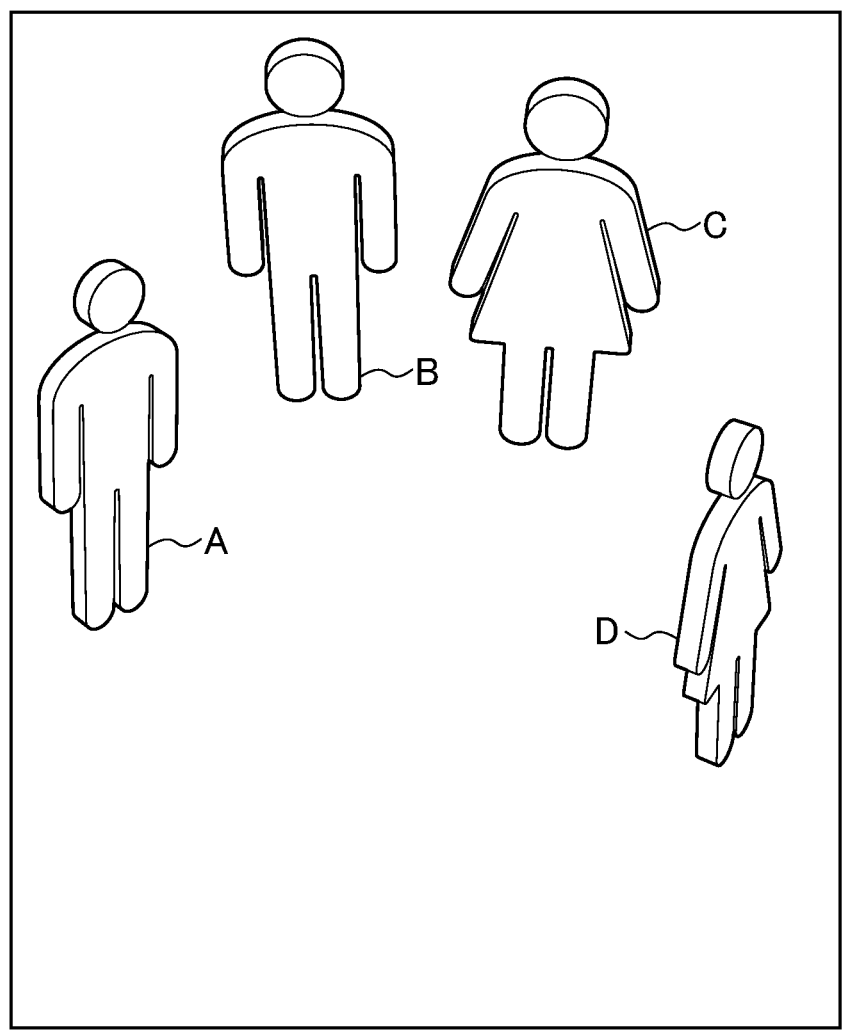
FIG. 7C is a diagram schematically illustrating content displayed on a display 23 of the viewer terminal 2.

FIG. 7C is a diagram schematically illustrating content displayed on the display 23 of the viewer terminal 2, and corresponds to FIG. 6. In FIG. 7C, it is assumed that the virtual camera is arranged at a position where the virtual space is viewed from above on a near side, and the entire virtual space is within the field of view of the virtual camera. Then, the virtual space viewed from the virtual camera is displayed on the display 23 of the viewer terminal 2.

Note that in a case where rendering is performed by the participant terminals 1a to 1d and the viewer terminal 2, since the display control data only needs to indicate the arrangements of the avatars A to D in the virtual space, the display control data transmitted to the participant terminals 1a to 1d and the viewer terminal 2 can be common. Then, each of the participant terminals 1a to 1d and the viewer terminal 2 processes the display control data, and generates an image displaying the virtual space viewed from the avatars A to D and the virtual camera.

On the other hand, in a case where the participant terminals 1a to 1d and the viewer terminal 2 perform rendering, image data corresponding to the images illustrated in FIGS. 7A to 7C is transmitted as the display control data. Therefore, the display control data transmitted to the participant terminals 1a to 1d and the viewer terminal 2 are different from each other.

[Processing Operation of Content Distribution System after Conversation Starts]

Figure 8:
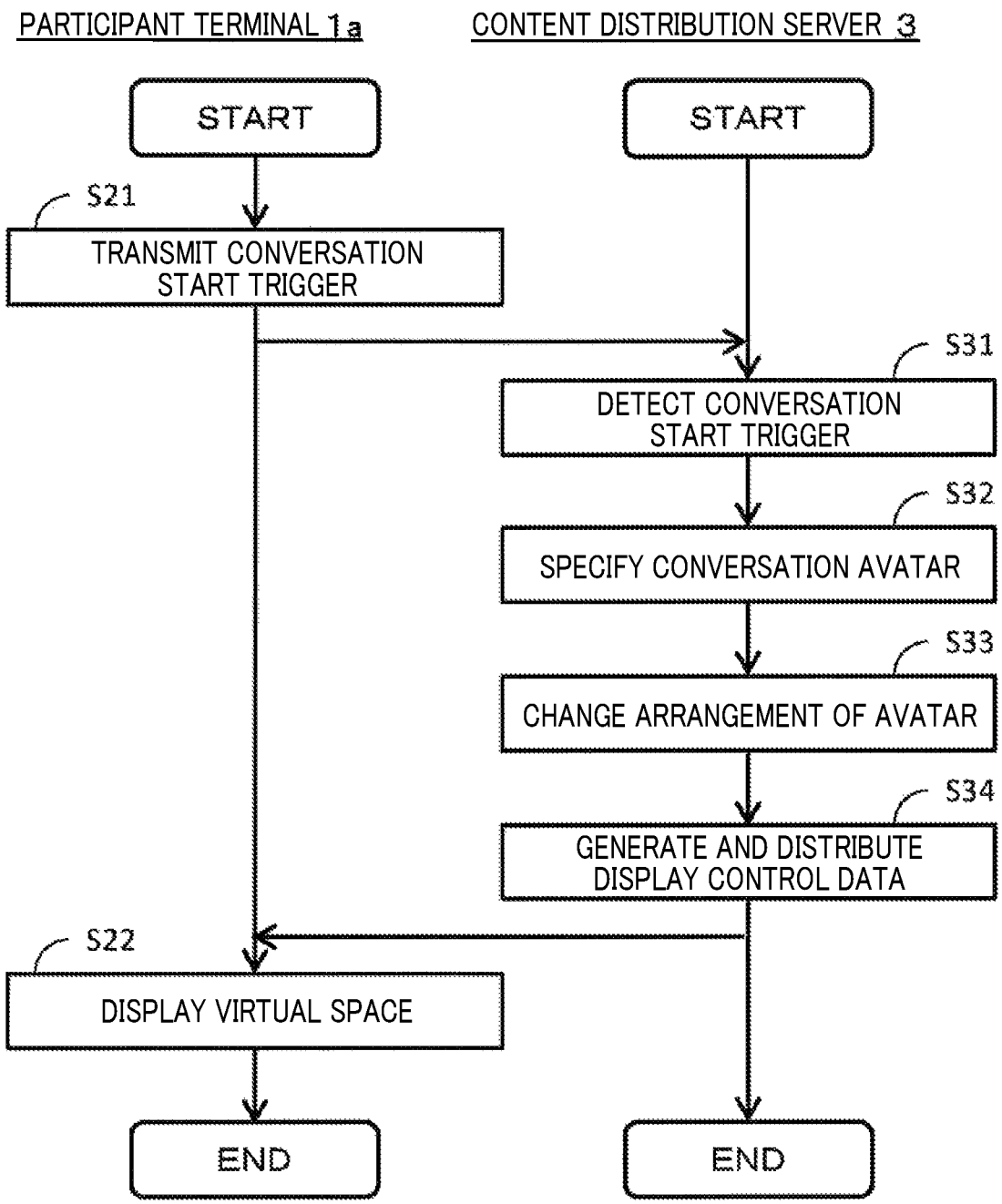
FIG. 8 is a sequence diagram illustrating an example of a processing operation of the content distribution system after a conversation starts.

FIG. 8 is a sequence diagram illustrating an example of a processing operation of the content distribution system after a conversation starts, and is performed following FIG. 5.

When the participant A instructs the participant terminal 1a to start a conversation, the trigger generator 162 generates a conversation start trigger and transmits the conversation start trigger to the content distribution server 3 (step S21). Note that information for specifying the avatar associated with the conversation start trigger, that is, the conversation avatar is also transmitted to the content distribution server 3. An instruction to start the conversation is given to the operation module 12 and/or the operation input module 13.

In a case where the participant terminal 1a is a smartphone, the instruction to start the conversation is, for example, an utterance to a microphone, an input of a specific character or word (for example, "!", "good morning", or the like) in a character input field displayed on the touch panel display, a press of a button, a touch of a predetermined icon displayed on the touch panel display, or a rotation of the smartphone from a vertical direction to a horizontal direction (detected by the acceleration sensor).

Further, the participant A may specify the conversation avatar. As an example, the conversation avatar may be designated by tapping an arbitrary avatar from among the avatars displayed on the touch panel display. Alternatively, an arbitrary avatar may be selected from a list of avatars arranged in the virtual space. Further, in a case like talking to oneself, the conversation avatar does not need to be specified (in this case, the conversation avatar is only the avatar A).

Further, in a case where the participant terminal 1a includes a controller for VR, the instruction to start a conversation may be a press of a predetermined button provided in the controller. Then, the conversation avatar may be specified by a pointer that is displayed in the virtual space in conjunction with movement of the controller.

When the conversation start trigger is transmitted, the trigger detector 332 of the content distribution server 3 detects the conversation start trigger (step S31). Further, the trigger detector 332 specifies the conversation avatar associated with the conversation start trigger (step S32). Note that the conversation avatar is not always necessarily to be specified by the participant A, and may be automatically specified by the trigger detector 332 depending on the context of the conversation.

In response to the detection of the conversation start trigger, the avatar controller 333a changes an arrangement of at least a part of the avatars in the virtual space, and updates the avatar arrangement information (step S33). As a result of such change of the arrangement, the arrangement of the avatar in the virtual space deviates from the operation of each participant on the operation input module 13.

Note that the avatar arrangement information updated here can be different for each of the participant terminals 1a to 1d and the viewer terminal 2. That is, the avatar arrangement information is generated for each of the participant terminals 1a to 1d and the viewer terminal 2 (in other words, for each avatar and for the virtual camera).

Next, the display control data generator 333b generates display control data on the basis of the generated avatar arrangement information. Then, the display control data is distributed to the participant terminal 1a (step S34). Further, the display control data is also distributed to the other participant terminals 1b to 1d and the viewer terminal 2. In a case where the avatar arrangement information is different for each of the participant terminals 1a to 1d and the viewer terminal 2, even when rendering is performed in the participant terminals 1a to 1d and the viewer terminal 2, display control information is different for each of the participant terminals 1a to 1d and the viewer terminal 2.

In accordance with the distribution of the display control data from the content distribution server 3, the display controller 165 of the participant terminal 1a receives display control data. In this display control data, the arrangement of the conversation avatar in the virtual space is changed as compared with the display control data received in step S2 of FIG. 5. On the basis of such display control data, the display controller 163 causes the display 15 to display the content (virtual space in which the avatar is arranged) (step S22). The other participant terminals 1b to 1d and the viewer terminal similarly display the content.

Note that even after the conversation start trigger is detected, the avatar arrangement acquisitor 331 of the content distribution server 3 acquires the arrangement of the avatar in the virtual space from the avatar controller 161 of each of the participant terminals 1a to 1d, and reflects the arrangement on the arrangement of the avatar or stores the arrangement in the storage 32 as necessary.

Figure 9A:
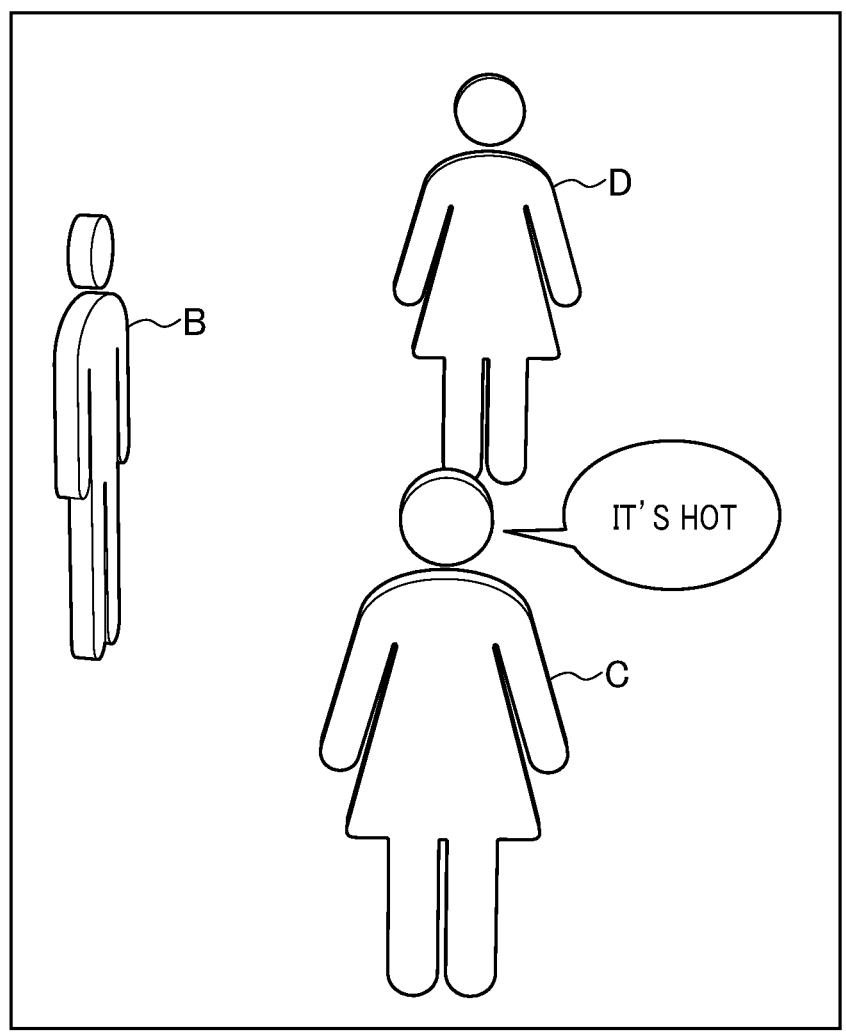
Figure 9B:
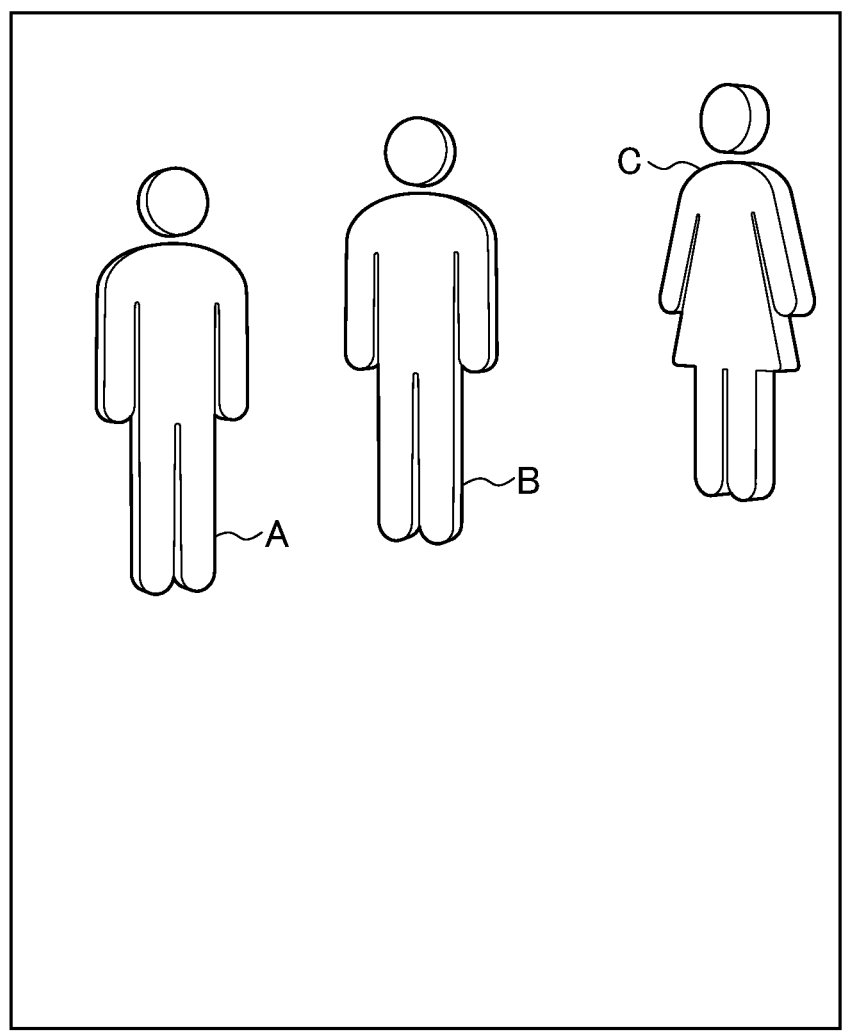
FIG. 9B is a diagram schematically illustrating content displayed on the display 15 of the participant terminal 1d.
Figure 9C:
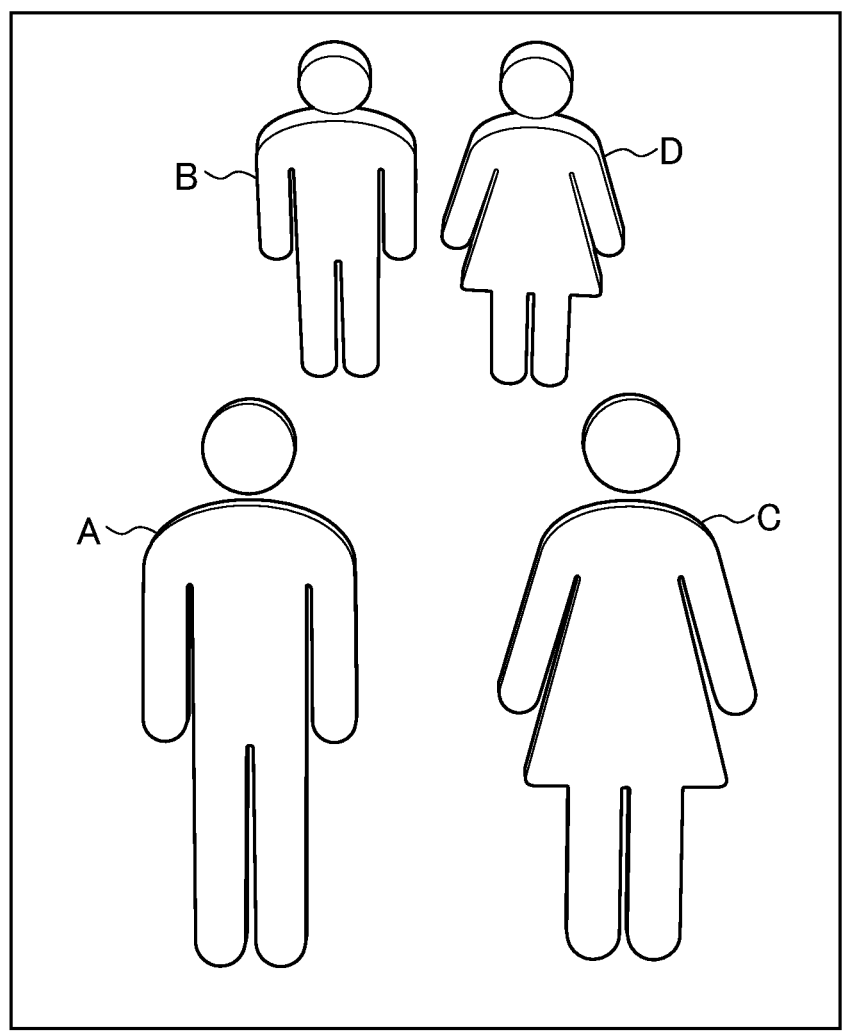
FIG. 9C is a diagram schematically illustrating content displayed on the display 23 of the viewer terminal 2.

FIG. 9A is a diagram schematically illustrating content displayed on the display 15 of the participant terminal 1a. Further, FIG. 9B is a diagram schematically illustrating content displayed on the display 15 of the participant terminal 1d. FIG. 9C is a diagram schematically illustrating content displayed on the display 23 of the viewer terminal 2. FIGS. 9A to 9C correspond to FIGS. 7A to 7C, respectively. It is assumed that the conversation start trigger in which the avatars A and C are conversation avatars is detected in the state of FIG. 6. FIG. 9A is a viewpoint of the conversation avatar, FIG. 9B is a viewpoint of the non-conversation avatar, and FIG. 9C is a viewpoint of the virtual camera.

As illustrated in FIG. 9A, the conversation avatar C, which is a conversation partner of the conversation avatar A, is displayed near the center of the display 15. More specifically, even when the conversation avatar C is not moved from the state in FIG. 6 (the participant C is not performing the operation for moving the avatar C), the conversation avatar C is displayed near the center of the display 15 in response to the conversation start trigger. This means that the conversation avatar C has been changed to approach the conversation avatar A for the participant terminal 1a in step S33 in FIG. 8. Further, the conversation avatar C may be displayed larger than that in FIG. 6.

In this manner, even if the conversation avatar C that is a conversation partner is away from oneself (the conversation avatar A), or even if the display 15 is small, the conversation avatar C can be emphasized and displayed in an easily viewable manner.

Further, it is desirable that the conversation avatar C face the conversation avatar A (face the front on the display 15). More specifically, even if the conversation avatar C is not facing the conversation avatar A in the state of FIG. 6, the conversation avatar C faces the conversation avatar A in response to the conversation start trigger. This is because it is natural for the conversation avatars A and C to face each other.

Furthermore, it is desirable that the non-conversation avatars B and D face the conversation avatar A or the conversation avatar C. More particularly, even if the non-conversation avatars B and D are not facing the conversation avatar A or the conversation avatar C in the state of FIG. 6, the non-conversation avatars B and D face the conversation avatar A or the conversation avatar C in response to the conversation start trigger. This is because it is also natural for the non-conversation avatars B and D to focus on the conversation avatar A or the conversation avatar C. Further, the non-conversation avatars B and D may face the conversation avatar A (face the front on the display 15) at the timing when the conversation avatar A utters, and face the conversation avatar C at the timing when the conversation avatar C utters.

Further, the arrangement positions of the non-conversation avatars B and D may be the same as or different from those in FIG. 6. Even in a different case, it is desirable to consider the arrangement position in FIG. 6, more specifically, the relative positional relationship between the non-conversation avatars B and D. For example, since the non-conversation avatar D is on the right side of the non-conversation avatar B in FIG. 6, the non-conversation avatar D is preferably arranged on the right side of the non-conversation avatar B in FIG. 9A in order to maintain such a positional relationship. In any case, since the importance is lower than that of the conversation avatar C, the non-conversation avatars B and D is only required to be appropriately displayed so as not to be unnatural.

Furthermore, an utterance of the avatar may be displayed in a balloon. Although not illustrated, this is similarly applicable to other drawings.

Note that the content displayed on the display 15 may be switchable between FIGS. 7A and 9A according to the operation of the participant A.

As illustrated in FIG. 9B, the content displayed on the display 15 of the participant terminal 1d corresponding to the non-conversation avatar D may be the same as in FIG. 7A. Such content is not changed in step S33 of FIG. 8 for the participant terminal 1d even after the conversation start trigger is detected, and the avatar controller 333a is only required to continuously generate the avatar arrangement information on the basis of the arrangement acquired by the avatar arrangement acquisitor 331.

As illustrated in FIG. 9C, the conversation avatars A and C are displayed near the center of the display 23 from the viewpoint of the virtual camera. This means that, in step S33 of FIG. 8, the conversation avatars A and C for the viewer terminal 2 (for the virtual camera) have been changed so as to approach the position of the virtual camera.

In this manner, even if the conversation avatars A and C are separated from each other, or even if the display 23 is small, the conversation avatars A and C can be emphasized and displayed in an easily viewable manner.

Further, it is desirable that the conversation avatars A and C face the position of the virtual camera (face the front on the display 23). Furthermore, it is desirable that the avatars B and D that are not conversation avatars face the conversation avatars A and C. Further, the non-conversation avatars B and D may face the conversation avatar A at the timing when the conversation avatar A utters, and face the conversation avatar C at the timing when the conversation avatar C utters.

Furthermore, as in FIG. 9A, the arrangement positions of the non-conversation avatars B and D may be the same as or different from FIG. 6.

Note that the content displayed on the display 23 may be switchable between FIGS. 7C and 9C according to the operation of the viewer user.

Figure 10:
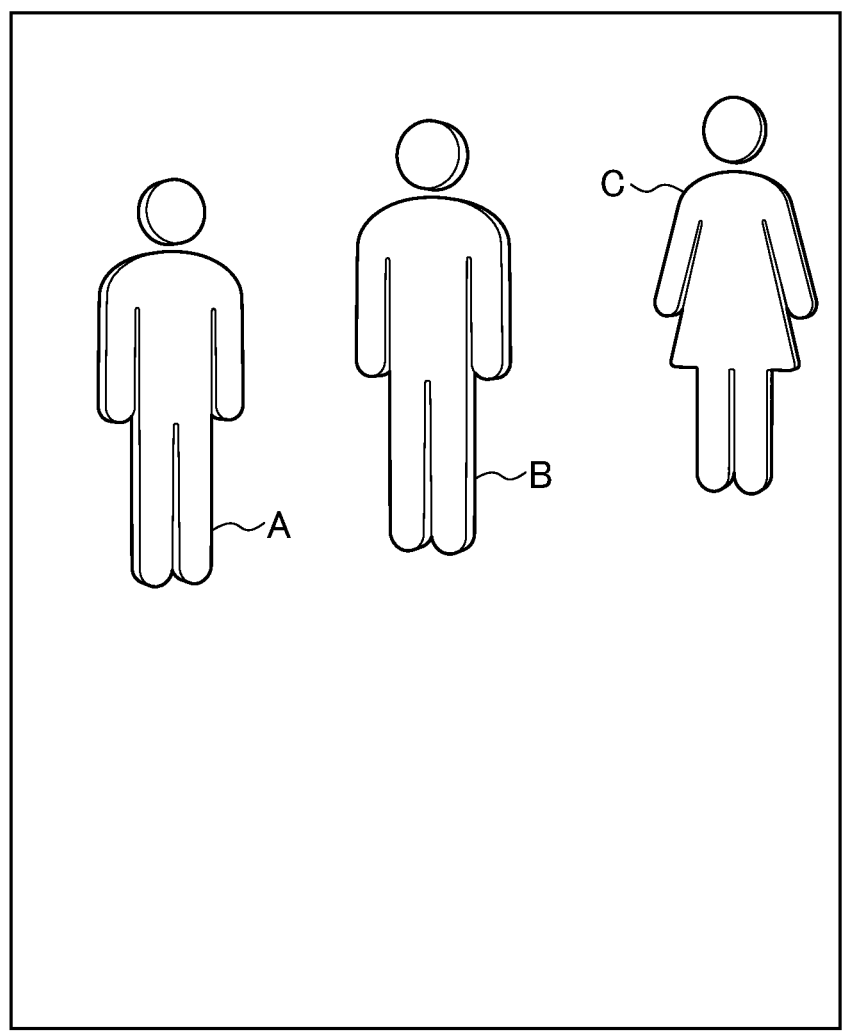
FIG. 10 is a diagram schematically illustrating content displayed on the display 15 of the participant terminal 1d, which is a modification example of FIG. 9B.

FIG. 10 is a diagram schematically illustrating content displayed on the display 15 of the participant terminal 1d, which is a modification example of FIG. 9B. Unlike FIG. 9B, the conversation avatars A and C are facing the position of the non-conversation avatar D (facing forward on the display 15). According to such display, it is easy for the participant D corresponding to the non-conversation avatar D to recognize that the avatars A and C facing itself are conversation avatars.

Figure 11:
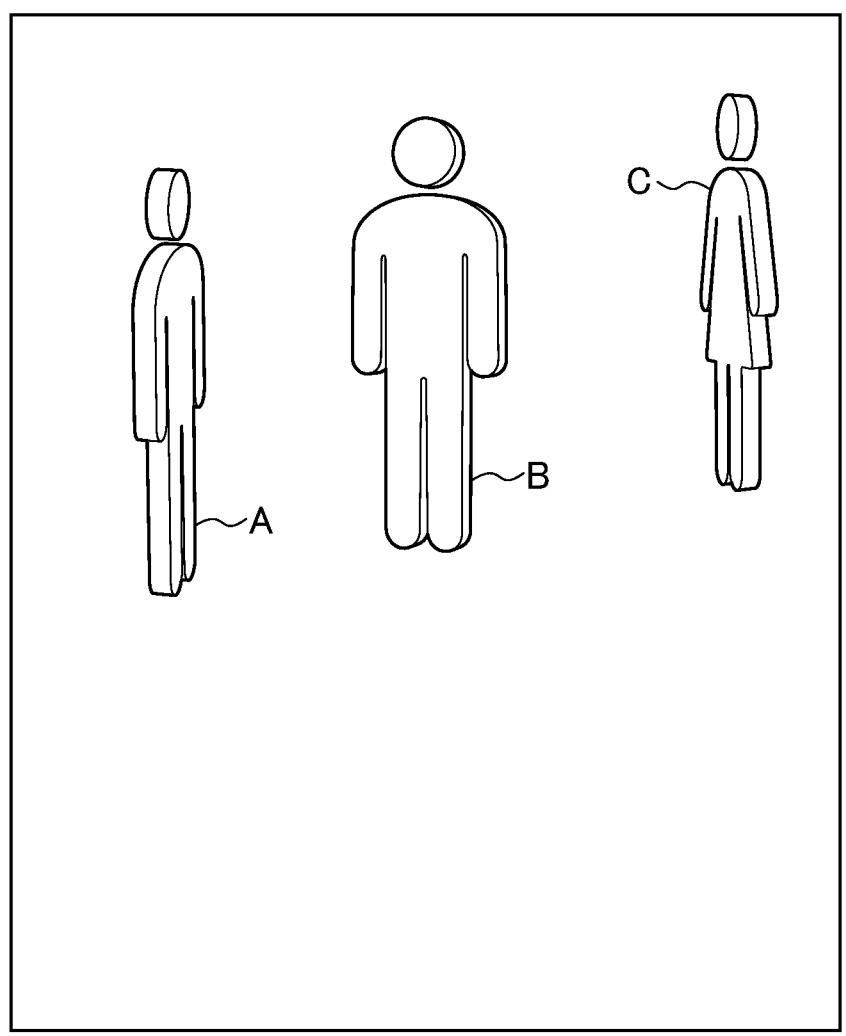
FIG. 11 is a diagram schematically illustrating content displayed on the display 15 of the participant terminal 1d, which is a modification example of FIG. 9B.

FIG. 11 is a diagram schematically illustrating content displayed on the display 15 of the participant terminal 1d, which is a modification example of FIG. 9B. Unlike FIG. 10, the conversation avatars A and C face each other. This is because display of a conversation while facing each other is natural. Note that in FIG. 9C, similarly, the conversation avatars A and C may face each other.

Figure 12:
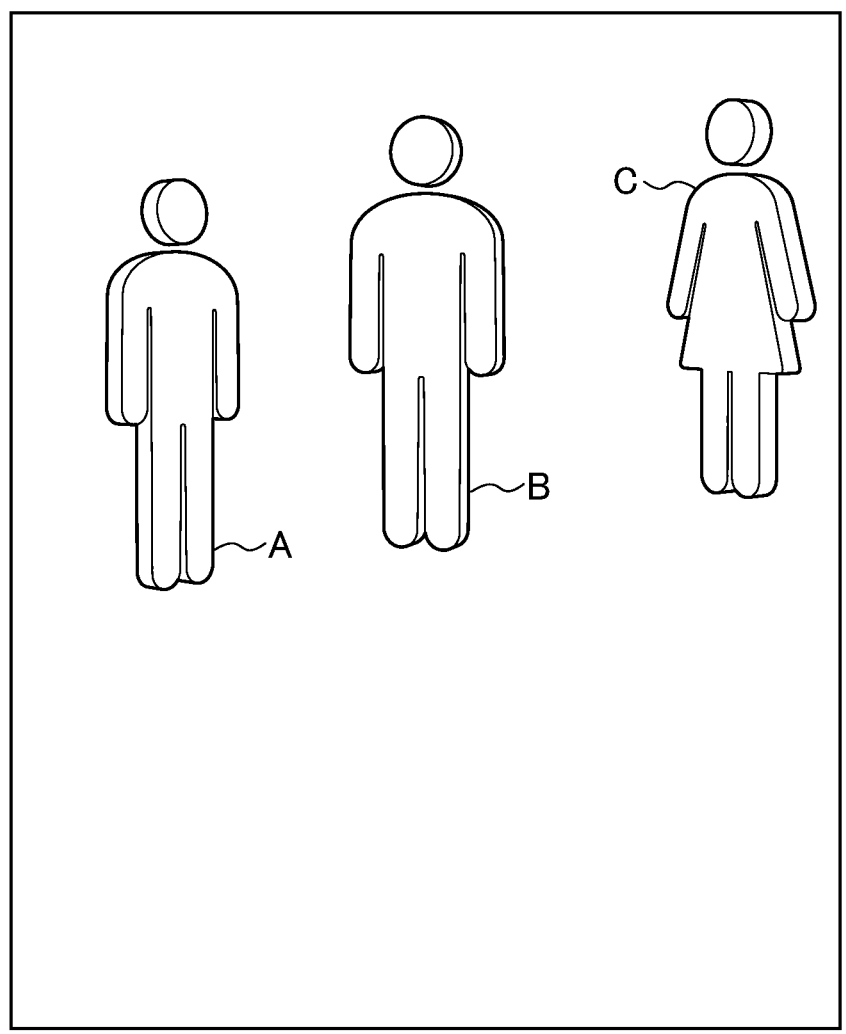
FIG. 12 is a diagram schematically illustrating content displayed on the display 15 of the participant terminal 1d, which is still another modification example of FIG. 9B.

FIG. 12 is a diagram schematically illustrating content displayed on the display 15 of the participant terminal 1d, which is still another modification example of FIG. 9B. Unlike FIGS. 10 and 11, the conversation avatar A may face a position between the non-conversation avatar D and the conversation avatar C, and the conversation avatar C may face a position between the non-conversation avatar D and the conversation avatar A. It is also easy for the participant D corresponding to the non-conversation avatar D to recognize that the avatars A and C are conversation avatars, and the conversation avatars A and C look as if facing each other, which is natural. Note that in FIG. 9C, similarly, the conversation avatar A may face a position between the virtual camera and the conversation avatar C, and the conversation avatar C may face a position between the virtual camera and the conversation avatar A.

Figure 13:
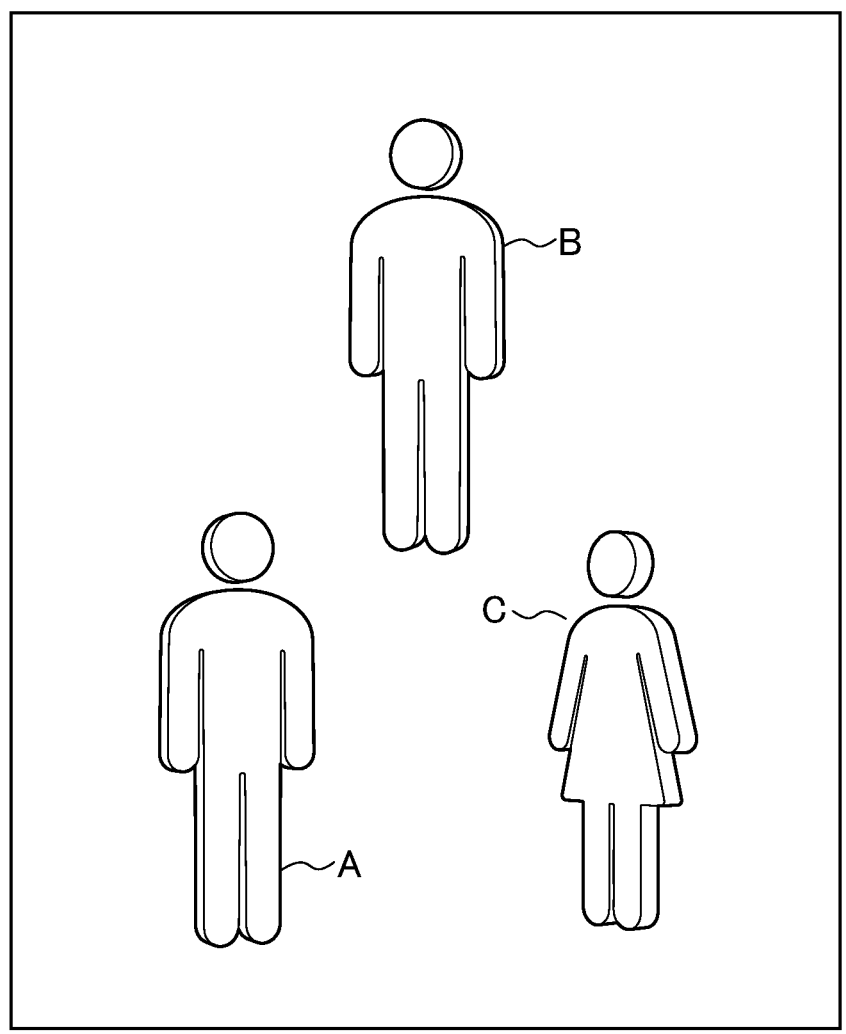
FIG. 13 is a diagram schematically illustrating content displayed on the display 15 of the participant terminal 1d, which is still another modification example of FIG. 9B.

FIG. 13 is a diagram schematically illustrating content displayed on the display 15 of the participant terminal 1d, which is still another modification example of FIG. 9B. As in FIG. 9A, the conversation avatars A and C may be displayed near the center of the display 15. The directions of the conversation avatars A and C at this time may be similar to any of FIGS. 10 to 12.

Note that regarding the arrangement of the conversation avatar and the non-conversation avatar, a plurality of templates may be determined in advance and stored in the storage 32. Then, when the conversation start trigger is detected, the avatar controller 333a selects an appropriate template on the basis of a rule determined according to the number of conversation avatars or non-conversation avatars, or the like. Then, the avatar controller 333a may arrange each avatar in the virtual space by applying each avatar to the selected template.

[Processing Operation of Content Distribution System after Conversation Ends]

Figure 14:
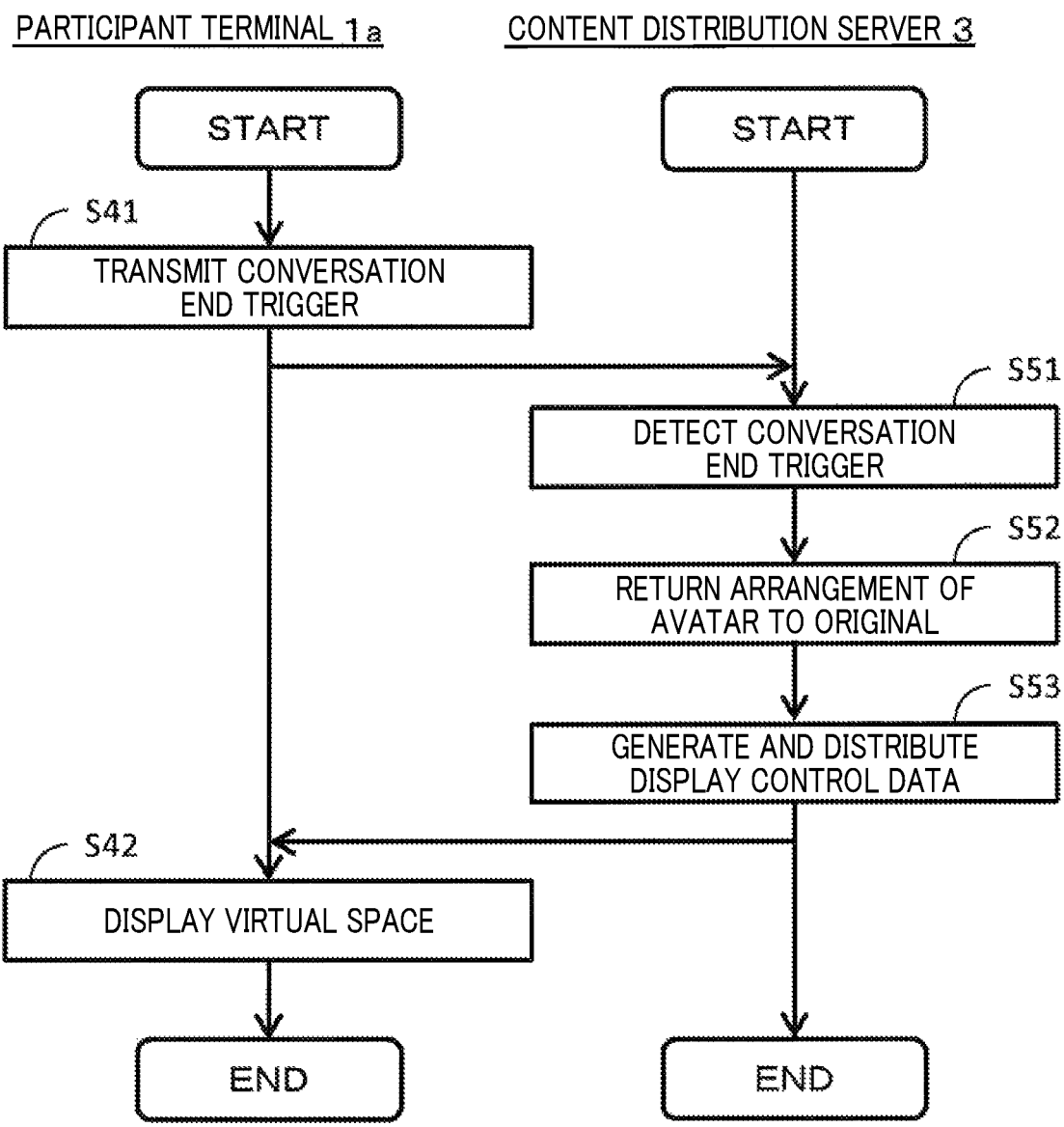
FIG. 14 is a sequence diagram illustrating an example of a processing operation of the content distribution system after a conversation ends.

FIG. 14 is a sequence diagram illustrating an example of a processing operation of the content distribution system after the conversation ends, and is performed following FIG. 8.

When the participant A instructs the participant terminal 1a to end the conversation, the trigger generator 162 generates the conversation end trigger and transmits the conversation end trigger to the content distribution server 3 (step S41). The instruction to end the conversation is given to the operation module 12 and/or the operation input module 13. Further, the instruction to end the conversation may be similar to the instruction to start the conversation.

For example, in a case where the participant terminal 1a is a smartphone, the instruction to end the conversation is, for example, an utterance to a microphone, an input of a specific character or word in the character input field displayed on the touch panel display, a press of a button, a touch of a predetermined icon displayed on the touch panel display, or a rotation of the smartphone from the horizontal direction to the vertical direction (detected by the acceleration sensor).

Further, in a case where the participant terminal 1a includes the controller for VR, the instruction to end the conversation may be a press of a predetermined button provided in the controller.

When the conversation end trigger is transmitted, the trigger detector 332 of the content distribution server 3 detects the conversation end trigger (step S51).

In response to the detection of the conversation end trigger, the avatar controller 333a returns the arrangement of the avatar changed in step S33 of FIG. 8 to the original (step S52). Specifically, the avatar controller 333a sets the arrangement of the avatar A in the virtual space on the basis of the arrangement of the avatar acquired by the avatar arrangement acquisitor 331, and updates the avatar arrangement information. Thus, the arrangement of each avatar in the virtual space returns to the arrangement in which the operation of the participant on the operation input module 13 is directly reflected.

Next, on the basis of the avatar arrangement information, the display control data generator 333b generates display control data and distributes the display control data to the participant terminal 1a (step S53). Further, the display control data is also distributed to the other participant terminals 1b to 1d and the viewer terminal 2.

In accordance with the distribution of the display control data from the content distribution server 3, the participant terminal 1a receives the display control data. On the basis of the display control data, the display controller 163 causes the display 15 to display content (virtual space in which the avatar is arranged) (step S42). The other participant terminals 1b to 1d and the viewer terminal similarly display the content.

As described above, the display has been as illustrated in FIGS. 9A to 9C after the detection of the conversation start trigger, but the display returns to the display as illustrated in FIGS. 7A to 7C by the detection of the conversation end trigger.

In this manner, in the present embodiment, the arrangement of the avatar in the virtual space is changed in accordance with the start of the conversation trigger. Thus, the avatar arranged in the virtual space can be displayed in an easily viewable manner.

Although the preferred embodiment of the present disclosure has been described above, the present disclosure is not limited to specific embodiments, and the present disclosure includes the invention described in the claims and the equivalent scope thereof. Further, the configurations of the devices described in the above-described embodiment and modification examples can be appropriately combined as long as no technical contradiction occurs.

According to one aspect of the present disclosure, there is provided a content distribution device including a virtual character arrangement acquisitor that acquires an arrangement in a virtual space of each of a plurality of virtual characters respectively corresponding to a plurality of participants in accordance with an operation of a corresponding participant, a trigger detector that detects a first trigger, and a display control data distributor that generates and distributes display control data for displaying at least a part of the virtual space in which the plurality of virtual characters is arranged, in which the display control data distributor generates the display control data in which arrangements of the plurality of virtual characters in the virtual space are arrangements according to arrangements acquired by the virtual character arrangement acquisitor until the first trigger is detected, and generates, in response to detection of the first trigger, the display control data in which an arrangement in the virtual space of a first virtual character associated with the first trigger among the plurality of virtual characters has been changed.

Preferably, the first trigger is transmitted from a terminal of a first participant corresponding to a second virtual character associated with the first trigger, and in response to detection of the first trigger, the display control data distributor generates the display control data in which the arrangement of the first virtual character in the virtual space has been changed so that the first virtual character is highlighted as compared with before the detection of the first trigger, the display control data being for displaying at least a part of the virtual space viewed from the second virtual character.

In response to the detection of the first trigger, the display control data distributor desirably generates the display control data in which the arrangement of the first virtual character in the virtual space has been changed so that the first virtual character approaches a predetermined position, the display control data being for displaying at least a part of the virtual space viewed from the predetermined position.

In response to the detection of the first trigger, the display control data distributor desirably generates the display control data in which the arrangement of the first virtual character in the virtual space has been changed so that the first virtual character faces a predetermined position, the display control data being for displaying at least a part of the virtual space viewed from the predetermined position.

Preferably, the first trigger is transmitted from the terminal of the first participant corresponding to the second virtual character associated with the first trigger, and the predetermined position is a position of the second virtual character.

The predetermined position is desirably a position different from any of the plurality of virtual characters.

The predetermined position is preferably a position of a third virtual character not associated with the first trigger among the plurality of virtual characters.

Preferably, the first trigger is transmitted from the terminal of the first participant corresponding to the second virtual character associated with the first trigger, the display control data includes first display control data for displaying at least a part of the virtual space viewed from the second virtual character and second display control data for displaying at least a part of the virtual space viewed from a third virtual character not associated with the first trigger, and the display control data distributor generates the first display control data in which the arrangement of the first virtual character has been changed so that the first virtual character is highlighted as compared with before the first trigger is detected in response to the detection of the first trigger, and generates the second display control data in which, until the first trigger is detected and after the first trigger is detected, the arrangement of the plurality of virtual characters in the virtual space is an arrangement according to the arrangement acquired by the virtual character arrangement acquisitor.

In response to the detection of the first trigger, the display control data distributor desirably generates the display control data in which the arrangements of the first virtual character and the second virtual character in the virtual space have been changed so that the first virtual character and the second virtual character associated with the first trigger face each other.

In response to the detection of the first trigger, the display control data distributor desirably generates the display control data in which the arrangement of the third virtual character in the virtual space has been changed so that the third virtual character not associated with the first trigger faces the first virtual character.

In response to the detection of the first trigger, the display control data distributor desirably generates the display control data in which the arrangement of the third virtual character in the virtual space has been changed so that the third virtual character faces the first virtual character when the first virtual character utters, and that the third virtual character faces the second virtual character when the second virtual character associated with the first trigger utters.

In response to the detection of the first trigger, the display control data distributor desirably generates the display control data in which the positions in the virtual space of a third virtual character and a fourth virtual character not associated with the first trigger have been changed in consideration of a relative positional relationship between the third virtual character and the fourth virtual character acquired by the virtual character arrangement acquisitor.

The display control data distributor desirably generates the display control data in which a display mode of the first virtual character has been changed in response to the detection of the first trigger.

The first trigger desirably corresponds to a start of a conversation between the second virtual character associated with the first trigger and the first virtual character.

Preferably, the trigger detector detects a second trigger after the first trigger is detected, and in response to the detection of the second trigger, the display control data distributor generate the display control data in which the arrangement in the virtual space of the first virtual character whose arrangement has been changed is returned to the arrangement according to the arrangement acquired by the virtual character arrangement acquisitor.

The second trigger desirably corresponds to the start of the conversation between the second virtual character associated with the first trigger and the first virtual character.

According to another aspect of the present disclosure, there is provided a content distribution program causing a computer to function as a virtual character arrangement acquisitor that acquires an arrangement in a virtual space of each of a plurality of virtual characters respectively corresponding to a plurality of participants in accordance with an operation of a corresponding participant, a trigger detector that detects a first trigger, and a display control data distributor that generates and distributes display control data for displaying at least a part of the virtual space in which the plurality of virtual characters is arranged, in which the display control data distributor generates the display control data in which arrangements of the plurality of virtual characters in the virtual space are arrangements according to arrangements acquired by the virtual character arrangement acquisitor until the first trigger is detected, and generates, in response to detection of the first trigger, the display control data in which an arrangement in the virtual space of a first virtual character associated with the first trigger among the plurality of virtual characters has been changed.

According to another aspect of the present disclosure, there is provided a content distribution method including acquiring, by a virtual character arrangement acquisitor, an arrangement in a virtual space of each of a plurality of virtual characters respectively corresponding to a plurality of participants in accordance with an operation of a corresponding participant, detecting a first trigger by a trigger detector, and generating and distributing, by a display control data distributor, display control data for displaying at least a part of the virtual space in which the plurality of virtual characters is arranged, in which the display control data distributor generates the display control data in which arrangements of the plurality of virtual characters in the virtual space are arrangements according to arrangements acquired by the virtual character arrangement acquisitor until the first trigger is detected, and generates, in response to detection of the first trigger, the display control data in which an arrangement in the virtual space of a first virtual character associated with the first trigger among the plurality of virtual characters has been changed.

According to another aspect of the present disclosure, there is provided a content display device including a virtual character controller that transmits, according to an operation of a participant, data indicating an arrangement in a virtual space of a first virtual character corresponding to the participant to a content distribution server, a trigger generator that generates a first trigger and transmits the first trigger to the content distribution server according to an instruction of the participant, and a display controller that displays at least a part of the virtual space in which a plurality of virtual characters including the first virtual character is arranged on the basis of display control data distributed from the content distribution server, in which the display controller receives, before transmission of the first trigger, the display control data in which arrangements of the plurality of virtual characters in the virtual space are arrangements corresponding to operations of a plurality of participants respectively corresponding to the plurality of virtual characters, and receives, after transmission of the first trigger, the display control data in which an arrangement in the virtual space of a second virtual character associated with the first trigger among the plurality of virtual characters has been changed.

According to another aspect of the present disclosure, there is provided a content display program causing a computer to function as a virtual character controller that transmits, according to an operation of a participant, data indicating an arrangement in a virtual space of a first virtual character corresponding to the participant to a content distribution server, a trigger generator that generates a first trigger and transmits the first trigger to the content distribution server according to an instruction of the participant, and a display controller that displays at least a part of the virtual space in which a plurality of virtual characters including the first virtual character is arranged on the basis of display control data distributed from the content distribution server, in which the display controller receives, before transmission of the first trigger, the display control data in which arrangements of the plurality of virtual characters in the virtual space are arrangements corresponding to operations of a plurality of participants respectively corresponding to the plurality of virtual characters, and receives, after transmission of the first trigger, the display control data in which an arrangement in the virtual space of a second virtual character associated with the first trigger among the plurality of virtual characters has been changed.

There is provided a content display method including transmitting, by a virtual character controller, according to an operation of a participant, data indicating an arrangement in a virtual space of a first virtual character corresponding to the participant to a content distribution server, generating, by a trigger generator, a first trigger and transmits the first trigger to the content distribution server according to an instruction of the participant, and displaying, by a display controller, at least a part of the virtual space in which a plurality of virtual characters including the first virtual character is arranged on the basis of display control data distributed from the content distribution server, in which the display controller receives, before transmission of the first trigger, the display control data in which arrangements of the plurality of virtual characters in the virtual space are arrangements corresponding to operations of a plurality of participants respectively corresponding to the plurality of virtual characters, and receives, after transmission of the first trigger, the display control data in which an arrangement in the virtual space of a second virtual character associated with the first trigger among the plurality of virtual characters has been changed.

REFERENCE SIGNS LIST 1a to 1d Participant terminal
11 Communicator
12 Operation module
13 Operation input module
14 STORAGE
15 Display
16 Controller
17 Avatar controller
18 Trigger generator
19 Display controller
2 Viewer terminal
21 Communicator
22 Operation module
23 Display
24 STORAGE
25 Controller
26 Display controller
3 Content distribution server
31 Communicator
32 STORAGE
33 Controller
331 Avatar arrangement acquisitor
332 Trigger detector
333 Display control data distributor
333a Avatar controller
333b Display control data generator

The invention claimed is:

1. A content distribution device comprising:
a virtual character arrangement acquisitor configured to acquire an arrangement in a virtual space of each of a plurality of virtual characters respectively corresponding to a plurality of participants in accordance with an operation of a corresponding participant;
a trigger detector configured to detect a first trigger and thereafter detect a second trigger, wherein a first virtual character among the plurality of virtual characters is associated to the first trigger; and
a display control data distributor configured to generate and distribute display control data for displaying at least a part of the virtual space in which the plurality of virtual characters is arranged,
wherein the display control data distributor is configured to:
generate the display control data in which arrangement positions of the plurality of virtual characters in the virtual space are arrangement positions according to arrangement positions acquired by the virtual character arrangement acquisitor until the first trigger is detected, wherein a first arrangement position of the first virtual character corresponds to an operation of a first participant corresponding to the first virtual character;
generate, in response to detection of the first trigger, the display control data in which an arrangement position in the virtual space of the first virtual character is changed from the first arrangement position to a second arrangement position, wherein the second arrangement position does not correspond to an operation of the first participant; and
generate, in response to detection of the second trigger, the display control data in which the arrangement position in the virtual space of the first virtual character whose arrangement position has been changed is returned to the first arrangement position,
wherein a distance between a predetermined position and the second arrangement position is shorter than a distance between the predetermined position and the first arrangement position.

2. The content distribution device according to claim 1, wherein
the first trigger corresponds to a start of a conversation between a second virtual character associated with the first trigger and the first virtual character, and
the second trigger corresponds to an end of the conversation between the second virtual character and the first virtual character.

3. The content distribution device according to claim 1, wherein the display control data distributor generates the display control data for displaying at least a part of the virtual space viewed from the predetermined position.

4. The content distribution device according to claim 1, wherein
the first trigger is transmitted from a terminal of a first participant corresponding to a second virtual character associated with the first trigger, and
the predetermined position is a position of the second virtual character.

5. The content distribution device according to claim 1, wherein the predetermined position is a position different from any of the plurality of virtual characters.

6. The content distribution device according to claim 1, wherein the predetermined position is a position of a third virtual character not associated with the first trigger among the plurality of virtual characters.

7. The content distribution device according to claim 1, wherein in response to the detection of the first trigger, the display control data distributor generates the display control data in which arrangement positions in the virtual space of a third virtual character and a fourth virtual character which are not associated with the first trigger are changed in consideration of a relative positional relationship between the third virtual character and the fourth virtual character acquired by the virtual character arrangement acquisitor.

8. The content distribution device according to claim 1, wherein the display control data distributor generates the display control data in which a display mode of the first virtual character is changed in response to the detection of the first trigger.

9. The content distribution device according to claim 1, wherein the display control data distributor is configured to generate, in response to the first trigger, the display data in which a size of the first virtual character is displayed larger than a size thereof before the first trigger is detected.

10. A computer-readable non-transitory medium storing a content distribution program causing a computer to perform a method comprising:
acquiring an arrangement in a virtual space of each of a plurality of virtual characters respectively corresponding to a plurality of participants in accordance with an operation of a corresponding participant;
detecting a first trigger and thereafter detects a second trigger, wherein a first virtual character among the plurality of virtual characters is associated to the first trigger; and
generating and distributing display control data for displaying at least a part of the virtual space in which the plurality of virtual characters is arranged,
wherein the generating and distributing the display control data comprises:
generating the display control data in which arrangement positions of the plurality of virtual characters in the virtual space are arrangement positions according to arrangement positions acquired by a virtual character arrangement acquisitor until the first trigger is detected, wherein a first arrangement position of the first virtual character corresponds to an operation of a first participant corresponding to the first virtual character;
generating, in response to detection of the first trigger, the display control data in which an arrangement position in the virtual space of the first virtual character has been changed from the first arrangement position to a second arrangement position, wherein the second arrangement position does not correspond to an operation of the first participant; and
generating, in response to detection of the second trigger, the display control data in which the arrangement position in the virtual space of the first virtual character whose arrangement position has been changed is returned to the first arrangement,
wherein a distance between a predetermined position and the second arrangement position is shorter than a distance between the predetermined position and the first arrangement position.

11. A content distribution method performed by at least one processor, the method comprising:
acquiring, by the at least one processor, an arrangement in a virtual space of each of a plurality of virtual characters respectively corresponding to a plurality of participants in accordance with an operation of a corresponding participant;
detecting, by the at least one processor, a first trigger and thereafter detects a second trigger, wherein a first virtual character among the plurality of virtual characters is associated to the first trigger; and
generating and distributing, by the at least one processor, display control data for displaying at least a part of the virtual space in which the plurality of virtual characters is arranged,
wherein the generating and distributing the display control data comprises:
generating the display control data in which arrangement positions of the plurality of virtual characters in the virtual space are arrangement positions according to arrangement positions acquired by a virtual character arrangement acquisitor until the first trigger is detected, wherein a first arrangement position of the first virtual character corresponds to an operation of a first participant corresponding to the first virtual character;
generating, in response to detection of the first trigger, the display control data in which an arrangement position in the virtual space of the first virtual character has been changed from the first arrangement position to a second arrangement position, wherein the second arrangement position does not correspond to an operation of the first participant; and
generating, in response to detection of the second trigger, the display control data in which the arrangement position in the virtual space of the first virtual character whose arrangement position has been changed is returned to the first arrangement position,
wherein a distance between a predetermined position and the second arrangement position is shorter than a distance between the predetermined position and the first arrangement position.

12. A content display device comprising:
- a virtual character controller configured to transmits, according to an operation of a first participant, to a content distribution server, data indicating an arrangement in a virtual space of a first virtual character corresponding to the first participant;
- a trigger generator configured to generate a first trigger and a second trigger and transmits the first trigger and the second trigger to the content distribution server according to an instruction of the first participant, wherein a second virtual character corresponding to a second participant is associated to the first trigger; and
- a display controller configured to display at least a part of the virtual space in which a plurality of virtual characters including the first virtual character is arranged on a basis of display control data distributed from the content distribution server,
- wherein the display controller is configured to:
- receive, before transmission of the first trigger, the display control data in which arrangement positions of the plurality of virtual characters in the virtual space are arrangement positions corresponding to operations of a plurality of participants respectively corresponding to the plurality of virtual characters, wherein a first arrangement position of the second virtual character corresponds to an operation of the second participant;
- receive, in response to transmission of the first trigger, the display control data in which an arrangement position in the virtual space of the second virtual character is changed from the first arrangement position to a second arrangement position, wherein the second arrangement position does not correspond to an operation of the second participant; and
- receive, in response to transmission of the second trigger after transmitting the first trigger, the display control data in which an arrangement position in the virtual space of the second virtual character whose arrangement position has been changed is returned to the first arrangement position,
- wherein a distance between a predetermined position and the second arrangement position is shorter than a distance between the predetermined position and the first arrangement position.

13. A computer-readable non-transitory medium storing a content display program causing a computer to perform a method comprising:
- transmitting, according to an operation of a first participant, to a content distribution server, data indicating an arrangement in a virtual space of a first virtual character corresponding to the first participant;
- generating a first trigger and a second trigger and transmits the first trigger and the second trigger to the content distribution server according to an instruction of the first participant, wherein a second virtual character corresponding to a second participant is associated to the first trigger; and
- displaying at least a part of the virtual space in which a plurality of virtual characters including the first virtual character is arranged on a basis of display control data distributed from the content distribution server,
- wherein the display comprises:
- receiving, before transmission of the first trigger, the display control data in which arrangement positions of the plurality of virtual characters in the virtual space are arrangement positions corresponding to operations of a plurality of participants respectively corresponding to the plurality of virtual characters, wherein a first arrangement position of the second virtual character corresponds to an operation of the second participant;
- receiving, in response to transmission of the first trigger, the display control data in which an arrangement position in the virtual space of the second virtual character is changed from the first arrangement position to a second arrangement position, wherein the second arrangement position does not correspond to an operation of the second participant; and
- receiving, in response to transmission of the second trigger after transmitting the first trigger, the display control data in which an arrangement position in the virtual space of the second virtual character whose arrangement position has been changed is returned to the first arrangement position,
- wherein a distance between a predetermined position and the second arrangement position is shorter than a distance between the predetermined position and the first arrangement position.

14. A content display method comprising performed by at least one processor:
- transmitting, by the at least one processor, according to an operation of a first participant, to a content distribution server, data indicating an arrangement in a virtual space of a first virtual character corresponding to the first participant;
- generating, by the at least one processor, a first trigger and a second trigger and transmits the first trigger and the second trigger to the content distribution server according to an instruction of the first participant, wherein a second virtual character corresponding to a second participant is associated to the first trigger; and
- displaying, by the at least one processor, at least a part of the virtual space in which a plurality of virtual characters including the first virtual character is arranged on a basis of display control data distributed from the content distribution server,
- wherein the displaying comprises:
- receiving, before transmission of the first trigger, the display control data in which arrangement positions of the plurality of virtual characters in the virtual space are arrangement positions corresponding to operations of a plurality of participants respectively corresponding to the plurality of virtual characters, wherein a first arrangement position of the second virtual character corresponds to an operation of the second participant;
- receiving, in response to transmission of the first trigger, the display control data in which an arrangement position in the virtual space of the second virtual character has been changed from the first arrangement position to a second arrangement position, wherein the second arrangement position does not correspond to an operation of the second participant; and
- receiving, in response to transmission of the second trigger after transmitting the first trigger, the display control data in which an arrangement position in the virtual space of the second virtual character whose arrangement position is changed is returned to the first arrangement position,
- wherein a distance between a predetermined position and the second arrangement position is shorter than a distance between the predetermined position and the first arrangement position.

* * * * *